US005977464A

United States Patent [19]

Bencomo, Jr.

[11] Patent Number: 5,977,464

[45] Date of Patent: Nov. 2, 1999

[54] DRUM SUPPORT SYSTEM

[76] Inventor: Joseph Bencomo, Jr., 2523 W. Diana St., Tampa, Fla. 33614

[21] Appl. No.: 08/964,557

[22] Filed: Nov. 5, 1997

[51] Int. Cl.[6] .......... G01D 13/02

[52] U.S. Cl. .......... 84/421

[58] Field of Search .......... 84/421

[56] References Cited

U.S. PATENT DOCUMENTS

| | | | |
|---|---|---|---|
| 1,022,149 | 4/1912 | Maphet | 84/421 |
| 3,780,613 | 12/1973 | Ludwig, Jr. | 84/421 |
| 4,829,874 | 5/1989 | Hoshino | 84/421 |

*Primary Examiner*—Robert E. Nappi
*Assistant Examiner*—Shih-yung Hsieh

[57] ABSTRACT

Various holders are provided to retain a tom-tom drum of the musical type in a playable position on a horizontally oriented surface, such as a floor. A percussion contact surface of the tom-tom drum must be perpendicular, or nearly perpendicular, to the horizontally oriented surface in order to be playable using holders of the instant invention. Various examples are given of transportable units which have a transportable orientation and a deployed orientation. Passive contact with the drum where gravitational retention occurs is explained as is active contact where structural attachment occurs. Adjustment means is provided to allow a specific holder to be employed with tom-tom drums of various diametric dimensions as well as with tom-tom drums having various spacing of the respective tension members.

16 Claims, 20 Drawing Sheets

FIG. 18a
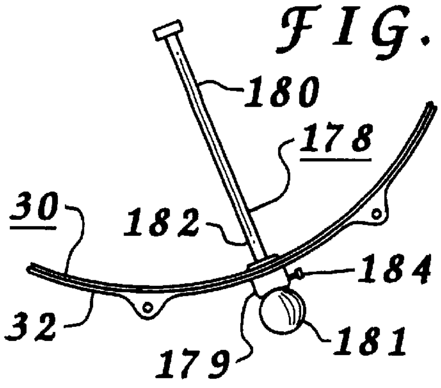
FIG. 18b
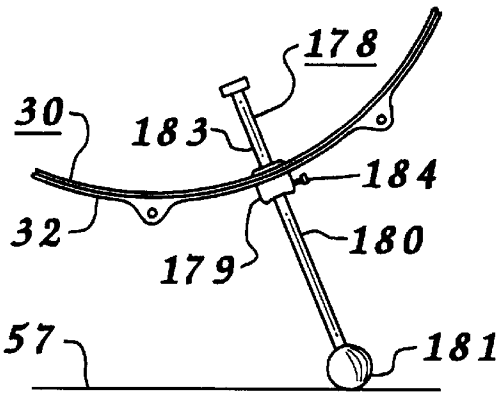
FIG. 19
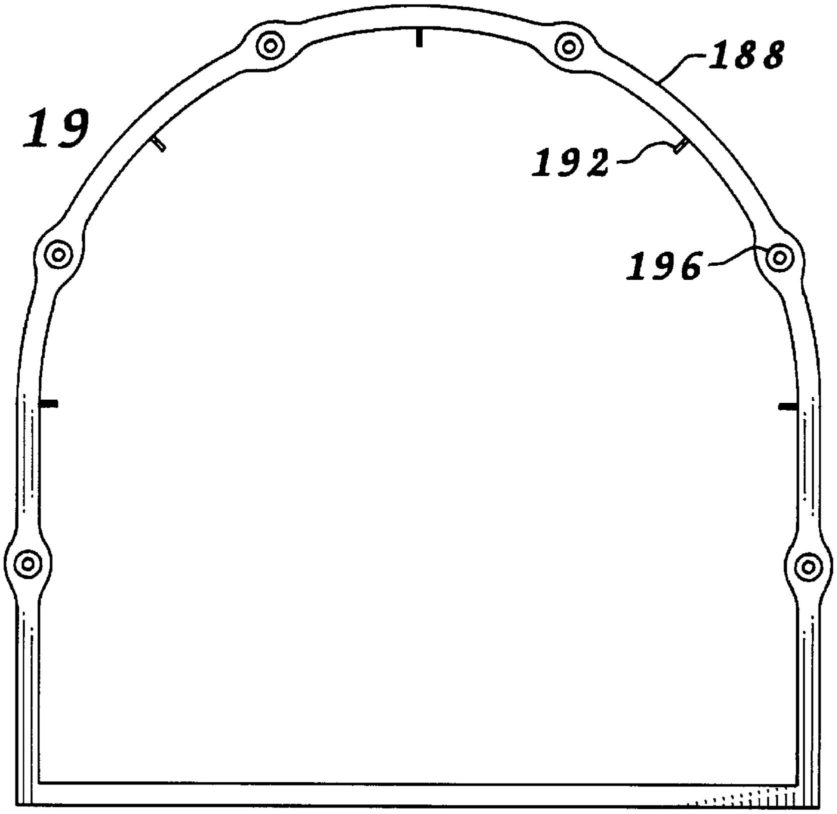
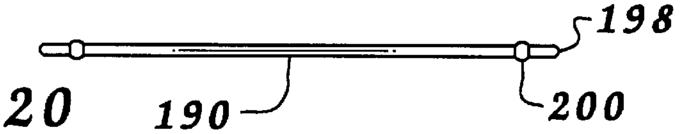
FIG. 20

DRUM SUPPORT SYSTEM

BACKGROUND

1. Field of the Invention

Generally, the invention relates to supports for musical drums. More specifically, the invention relates to such supports which retain the musical drum wherein the percussion contact surface of the drum is generally perpendicular to the floor for impaction thereof by a striker.

2. Description of the Prior Art

The instant invention has two (2) primary considerations. The first consideration is the desire to provide the musician with full creative expression by expanding the tonal characteristics which may be produced by the musician. The second consideration is the practical desires of allowing for ease of transport to and from the performance site and the ability to utilize tom-tom drums which exist within the musician's collection of drums.

Numerous methods exist to support musical drums wherein a percussion contact surface of the drum may be struck by an impaction member. Within these methods the percussion contact surface of the drum may be retained parallel to the floor, hereinafter upright, perpendicular to the floor, hereinafter sideways, or at a desired angular orientation between upright and sideways.

There exist two (2) common methods for a drummer to provide for impaction of a musical drum. The first method involves impaction of an impaction surface of the drum by a hand held striker member, as exampled by a drum stick. The second method involves impaction of the impaction surface of the drum by a striker member controlled by a foot pedal assembly. Generally, when the drum is sideways with the percussion contact surface of the drum perpendicular, or nearly perpendicular, to the floor, the impaction member is mounted to a foot pedal assembly. It is generally accepted practice to utilize a large diameter drum, as exampled by bass drums, when so deployed sideways in combination with a foot pedal assembly.

Within drum sets bass drums are routinely deployed for impaction by a striker controlled by a foot pedal assembly. Bass drums generally have diameters between eighteen (18) and thirty (30) inches with depths generally with the range of fourteen (14) and eighteen (18) inches. When a bass drum is deployed for use with the foot pedal assembly, the bass drum is sideways with the impaction surface of the bass drum perpendicular, or nearly perpendicular, to the floor. Additionally, a lowest extent of the impaction surface is relatively close, in the range of several inches, above the floor.

There exists a class of drums referred to as tom-tom drums. These drums generally have diameters between eight (8) and eighteen (18) inches with depths generally within the same range. The tom-tom drum may be mounted substantially above the floor for impaction by a drum stick held by the drummer. This type of deployment is exampled by attachment to another drum, such as a bass drum, to an overall drum set frame assembly or supported by a dedicated floor stand. Alternatively, the tom-tom drum may be deployed as a floor or side tom-tom. Generally, a tom-tom drum having a diameter in the upper range of tom-tom drums is utilized as a floor or side tom-tom. Without regard for the deployment method selected, tom-tom drums are normally impacted by a drum stick held by the drummer. Tom-tom drums are universally mounted within the drum set in generally upright positions with the percussion contact surface parallel, or slightly off parallel, relative to the floor. It is typical for a drummer to have tom-tom drums within his or her collection of drums.

It is common practice within the industry to permanently attach at least one mounting member to a portion of the drum. These mounting members may be attached at various locations on the drum. The most common attachment locations are penetrating the wall of the drum housing, to the rim and to the tension bars. These mounting members in turn attach, permanently or temporarily, to other support assemblies. This attachment ultimately provides for rigid restriction of the drum in a desired positional orientation during play thereof by the musician. This is exampled by the drum being attached to another drum, to the drum set frame assembly or to a dedicated floor stand. Another example has the drum supported on the floor in a solitary manner. Yet another example provides for a combination of direct floor support with attachment to other components of the drum set.

Various deficiencies exist with current use sideways positioned floor drums as utilized for play with a foot pedal assembly. One of the principle deficiencies resides in the size of the currently utilized bass drum. It is not convenient for many musicians to transport all of the equipment required by a current use drum set which includes bass drums, and particularly the larger bass drums. Drummers must transport a significant quantity of equipment when traveling to a performance site. Drummers often must travel on airlines, taxis, subways, commercial carrier buses, trains and tour buses. These requirements result in a restricted amount of space being available to the drummer.

Tonal characteristics of music are ever changing. Musicians are required to perform more varied types of music than has ever before been required. More musical performances have what is commonly referred to as a world beat which included more ethnic rhyme than has been previously performed domestically. As a result it is important that drummers be provided with drum configurations which allow for adaptation of the style of play to produce the musical effects desired and envisioned. The present invention will allow the drummer to compliment the current use floor positioned bass drum with a floor positioned tom-tom drum with both being operated by foot pedal assemblies.

Another deficiency which exists with current use floor positioned bass drums, due to the desire to impact the impaction surface at a generally central location thereon, is that the striker of the foot pedal assembly must be elevated a significant distance from the floor at the point of impact. This significantly reduces the control thereover which the musician has during play. Improvements in materials have enabled tuning of the smaller tom-tom drums to imitate quite successfully a wide varieties of musical sounds. This includes those sounds produced by certain bass drums. Tom-tom drums, due to their smaller size, are more easily transported than the larger bass drums. Due to the smaller diametric measurement of the tom-tom drums, a lower elevational impact point may be selected on the impaction surface. Additionally, the majority of serious drummers have spare tom-tom drums within their collection of drums.

Various attempts have been made to provide for ready transport of drum sets. These attempts have been less efficient than desired. As such, it may be appreciated that there continues to be a need for a substitution of the existing bass drum within a drum set with a tom-tom drum capable of similar play and capable of producing similar musical sounds. The present invention substantially fulfills these needs.

SUMMARY

In view of the foregoing disadvantages inherent in the known types of sideways positioned floor drums, your applicant has devised a method of utilizing a tom-tom drum as a replacement for a current use floor positioned bass drum wherein the tom-tom drum may be impacted by a striker following activation of the striker by a foot operated pedal assembly. A tom-tom drum holder assembly is provided to retain the tom-tom drum. The tom-tom drum having a body member and a percussion contact surface. The body member of the tom-tom drum having a percussion end, a distal end and a radially disposed wall member separating the percussion end and the distal end. The tom-tom drum holder assembly having a holder support member, a tom-tom drum support member and retention means. The holder support member to provide for supporting the tom-tom drum holder assembly on a horizontally oriented surface. The tom-tom drum support member to provide for supporting the tom-tom drum. The retention means to provide for a cooperation between the holder support member and the tom-tom drum support member. The cooperation to retain the tom-tom drum relative to the horizontally oriented surface wherein the percussion contact surface of the tom-tom drum is generally perpendicular to the horizontally oriented surface. The retention of the percussion contact surface of the tom-tom drum generally perpendicular to the horizontally oriented surface to allow for impacting of the percussion contact surface by a striker following at least a partially horizontally oriented displacement of the striker.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for utilization of a tom-tom drum as a sideways positioned floor drum.

Other objects include;

a) to provide for replacement of a floor positioned bass drum by a tom-tom drum.

b) to provide for complimentary usage of a floor positioned tom-tom drum with existing floor positioned bass drums.

c) to provide for a tom-tom drum to be retained for impaction thereon by a striker following activation of the striker by a foot operated pedal assembly.

d) to provide for use of a tom-tom drum within the instant invention without requiring special connection members to be permanently attached to the tom-tom drum.

e) to provide for usage of tom-tom drums currently existing within a drummers collection of drums.

f) to provide for more ready ease of transport of the drum set by the musician.

g) to provide for production of more varied tonal characteristics by the musician than those producible utilizing a standard drum set.

h) to provide for usage of a foot pedal assembly wherein the striker may be positioned to have a lower elevational height at the point of impact than that elevational height required by floor positioned bass drums.

i) to provide for retention of a tom-tom drum wherein contact by the tom-tom drum holder assembly is made in close proximity to a percussion contact surface thereon.

j) to provide for retention of a tom-tom drum wherein contact by the tom-tom drum holder assembly is also made in close proximity to a distal end thereon.

k) to provide for a transportable drum support assembly having a transportable configuration and a deployed configuration.

l) to provide for the transportable drum support assembly to be self contained while in the transportable configuration.

m) to provide the musician with a drum set which is more manageable.

n) to provide the musician with a drum set which allows for more creative play.

o) to provide for usage of sideways positioned tom-tom drum for use in a percussion set up.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 18*a* is a rear sectional view of yet another embodiment of a tom-tom drum holder assembly in a retracted orientation.

FIG. 18*b* is a rear sectional view of the tom-tom drum holder assembly shown in FIG. 18*a* in an extended orientation.

FIG. 19 is a rear plan view of a bracket.

FIG. 20 is a side plan view of a connection rod.

DESCRIPTION

Figure 1:
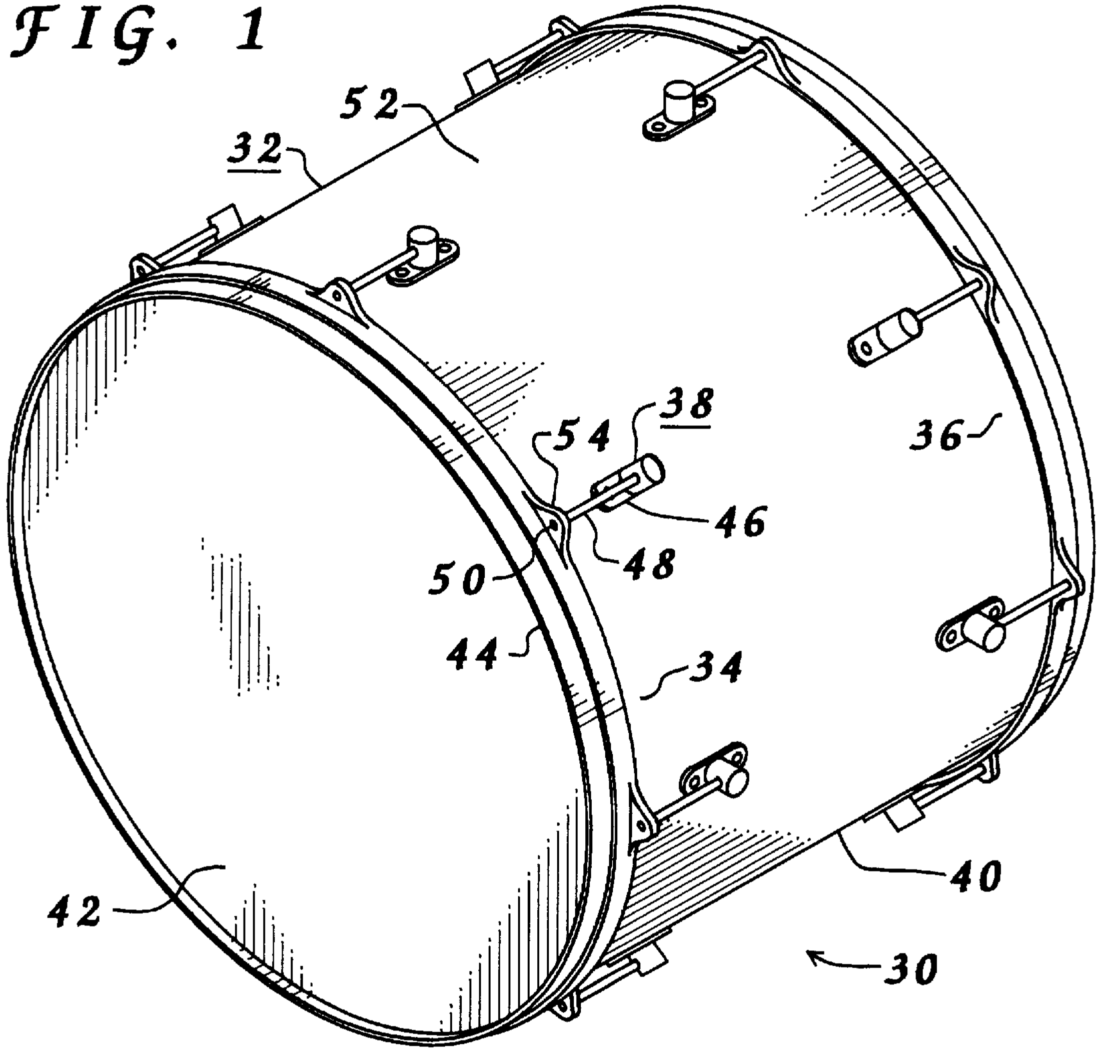
FIG. 1 is a perspective view of a tom-tom drum.

Reference is now made to the drawings where like reference numerals refer to like parts throughout the various views. A tom-tom drum 30 is depicted in various views and specifically in FIG. 1. Tom-tom drum 30 comprises a body member 32, a percussion end 34, a distal end 36 and various tension members 38. Body member 32 is formed of a wall member 40 which is radially disposed and closed at percussion end 34 by a percussion contact surface 42. While distal end 36 may be open, generally distal end 36 will be at least partially closed.

A hoop 44 is radially disposed about percussion end 34 and is secured to body member 32 by a plurality of tension members 38. Adjustment of hoop 44 relative to body member 32 allows for adjustment of the tension of percussion contact surface 42. Each tension member 38 comprises an anchor mount 46, a tension bar 48 and a bar anchor 50. Each anchor mount 46 is secured to an outer surface 52 of wall member 40 in a uniform pattern thereabout. Each bar anchor 50 securely attaches to hoop 44 at a mounting flange 54. Each tension member 38 may be adjusted as conventionally known in the art.

Any tom-tom drum may be employed with the instant invention. Generally, tom-tom drums have a diameter from eight (8) inches to eighteen (18) inches and depths of about the same range. Tom-tom drum 30 shown in the various views falls within the middle of this range.

It is desired to position tom-tom drum 30 in close proximity to a horizontally oriented surface, generally a floor, wherein percussion contact surface 42 of tom-tom drum 30 may be impacted by a striker operated by a foot pedal assembly. It is a requirement that tom-tom drum 30 be supported in a sufficient manner to retain tom-tom drum 30 during play therewith. It is therefore necessary to provide for supporting contact with some portion, or portions, of tom-tom drum 30. This contact may include contact with hoop 44, tension bars 48, anchor mounts 46 or wall member 40. This contact may be passive wherein gravitational force is relied upon, or may be active wherein engaging contact is structurally provided. While it is preferred to provide this contact at opposing ends of tom-tom drum 30, it is possible to provide such contact at one general location on tom-tom drum 30. This is exampled by a rigid contact at hoop 44 or at one or more tension members 38 or at a central location on body member 32. Alternatively, it is possible to provide specific support at one end of tom-tom drum 30 while allowing the opposing end to rest on the horizontally oriented surface. Various examples follow which illustrate the principles of the invention.

While all drum holder assemblies designed upon the instant invention are transportable, it is possible to provide a heightened level of convenience to such transport. This is accomplished by providing for transfer between a transportable configuration where movement of the assembly is simplified by a compact containment of the elements and a deployed configuration where at least some of the elements cooperate to provide for retention of the drum in a playable position utilizing a foot pedal assembly.

Figure 5:
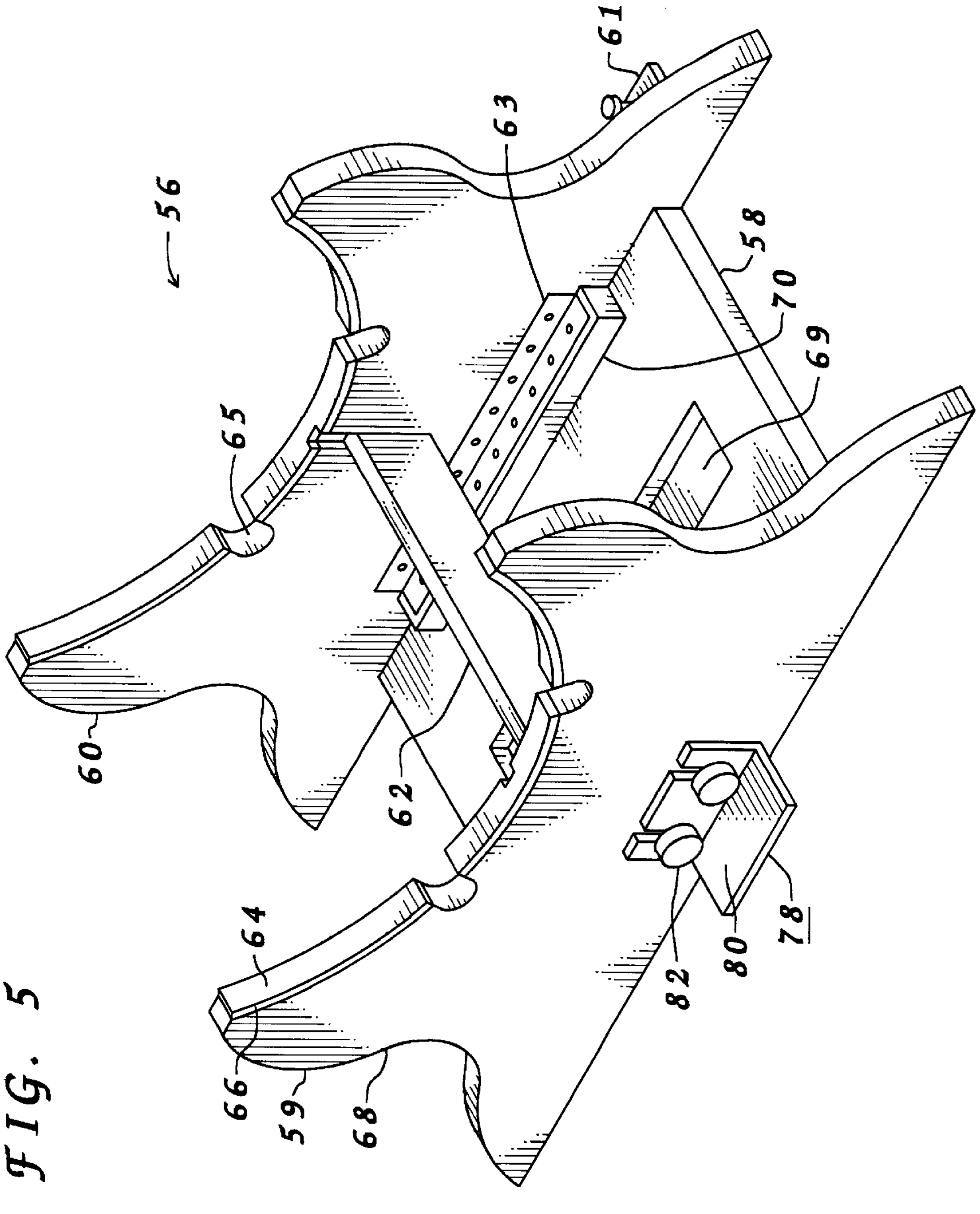
FIG. 5 is a perspective view of the transportable drum support assembly shown in FIG. 2 through FIG. 4 in a deployed configuration.
Figure 6:
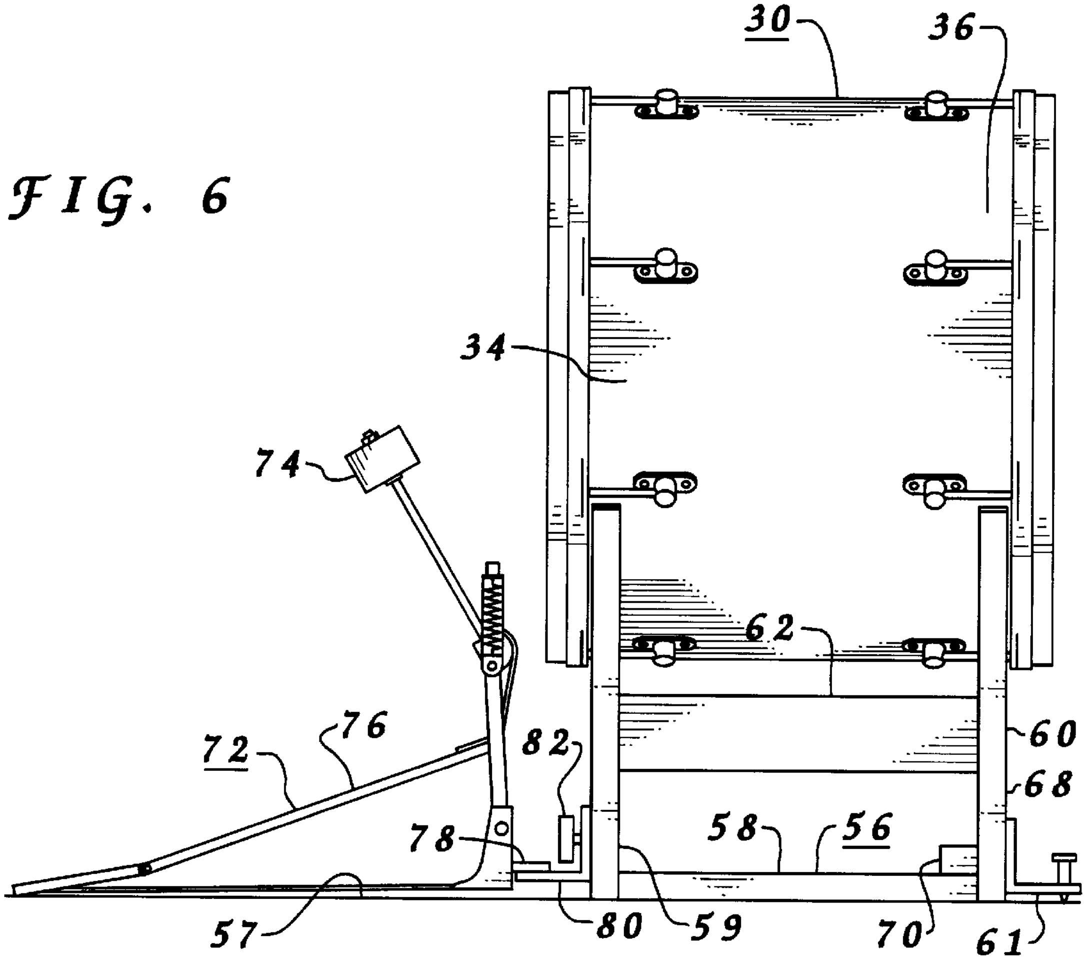
FIG. 6 is side plan view of the transportable drum support assembly shown in FIG. 5 with the tom-tom drum shown in FIG. 1 and a foot pedal assembly positioned thereon.
Figure 7:
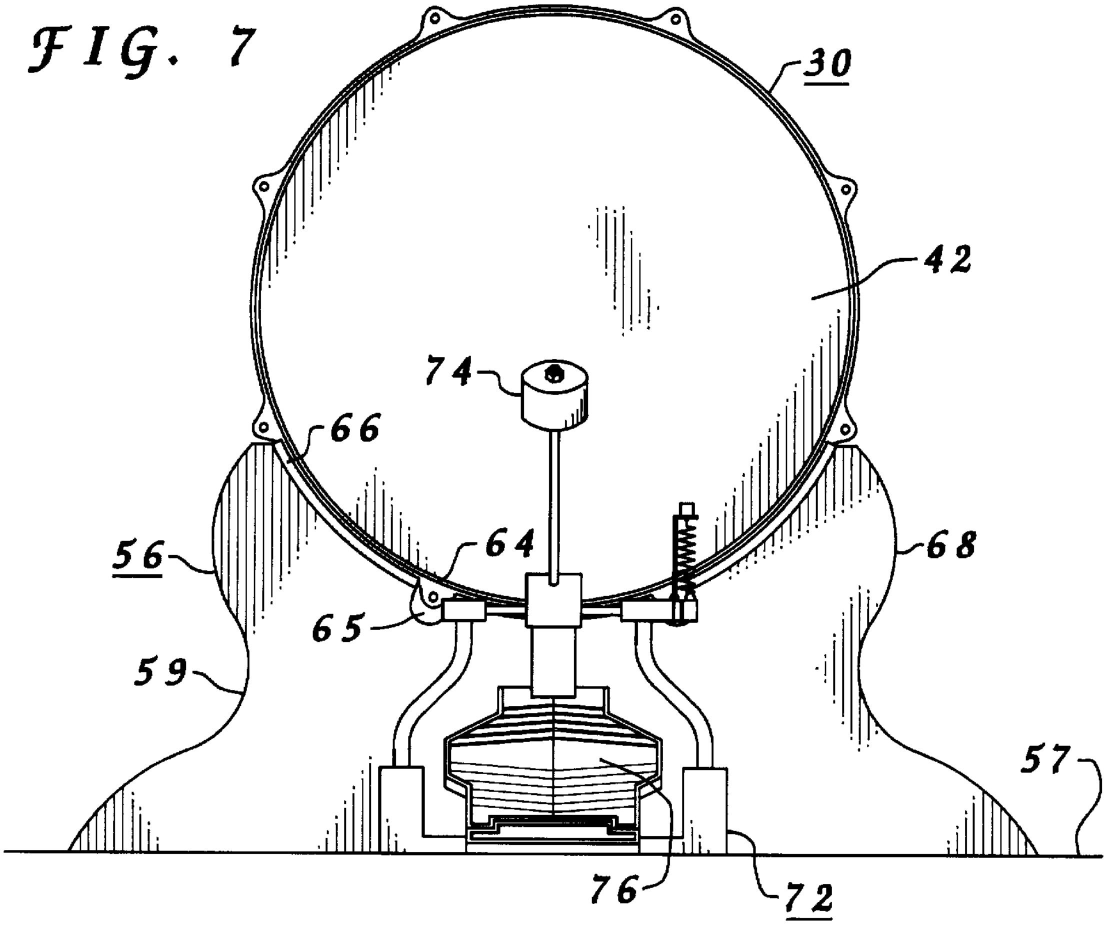
FIG. 7 is rear plan view of the assembly shown in FIG. 6.

FIG. 2 through FIG. 7 depict a transportable drum support assembly 56 capable of supporting tom-tom drum 30 on a horizontally oriented surface 57, see FIG. 6 and FIG. 7. Transportable drum support assembly 56 comprises a base 58, a first support member 59 and a second support member 60. Base 58 may have attached thereto opposing spurs 61, as conventionally known in the art, which may be adjusted to provide additional retention properties for transportable drum support assembly 56 relative to horizontally oriented surface 57. A brace 62 is provided to allow for support members 59 and 60 to be retained relative to base 58. Support members 59 and 60 are securely attached to base 58 utilizing hinges 63.

Each support member 59 and 60 has a contact surface 64 which is radially disposed and which generally matches outer surface 52 of wall member 40 of tom-tom drum 30. Each support member 59 and 60 has a plurality of recesses 65 within contact surface 64 to accommodate tension members 38 of tom-tom drum 30. Contact surface 64 preferably is formed of a compressible material 66 to insulate tom-tom drum 30 during play while in transportable drum support assembly 56. Base 58, support members 59 and 60 and brace 62 provide for a cooperation therebetween to provide the support of tom-tom drum 30.

As depicted in FIG. 6 it is preferred that support members 59 and 60 contact tom-tom drum 30 in spaced relationship in close proximity to percussion end 34 and distal end 36 respectively.

Figure 2:
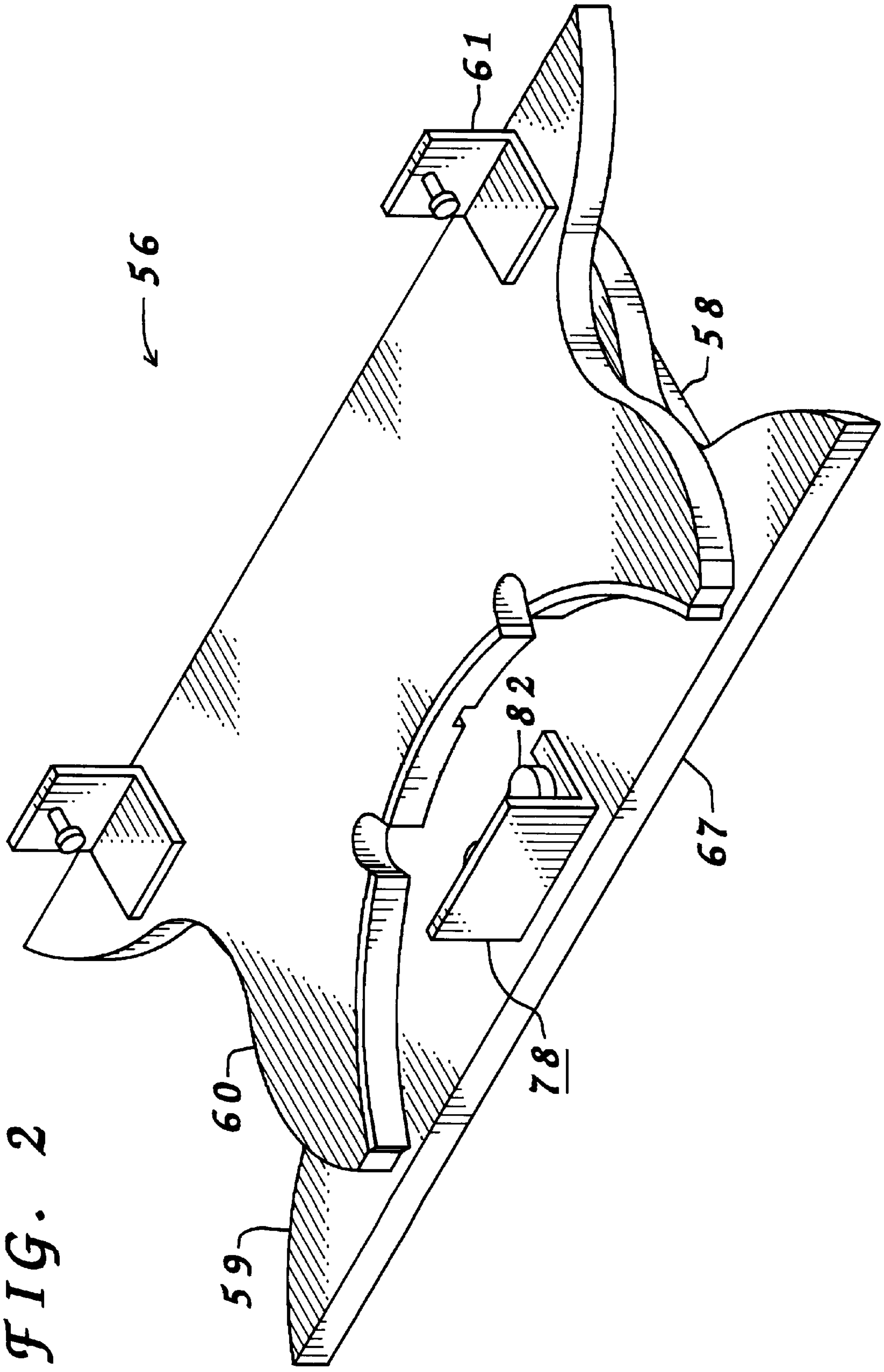
FIG. 2 is a perspective view of a transportable drum support assembly in a transportable configuration.
Figure 3:
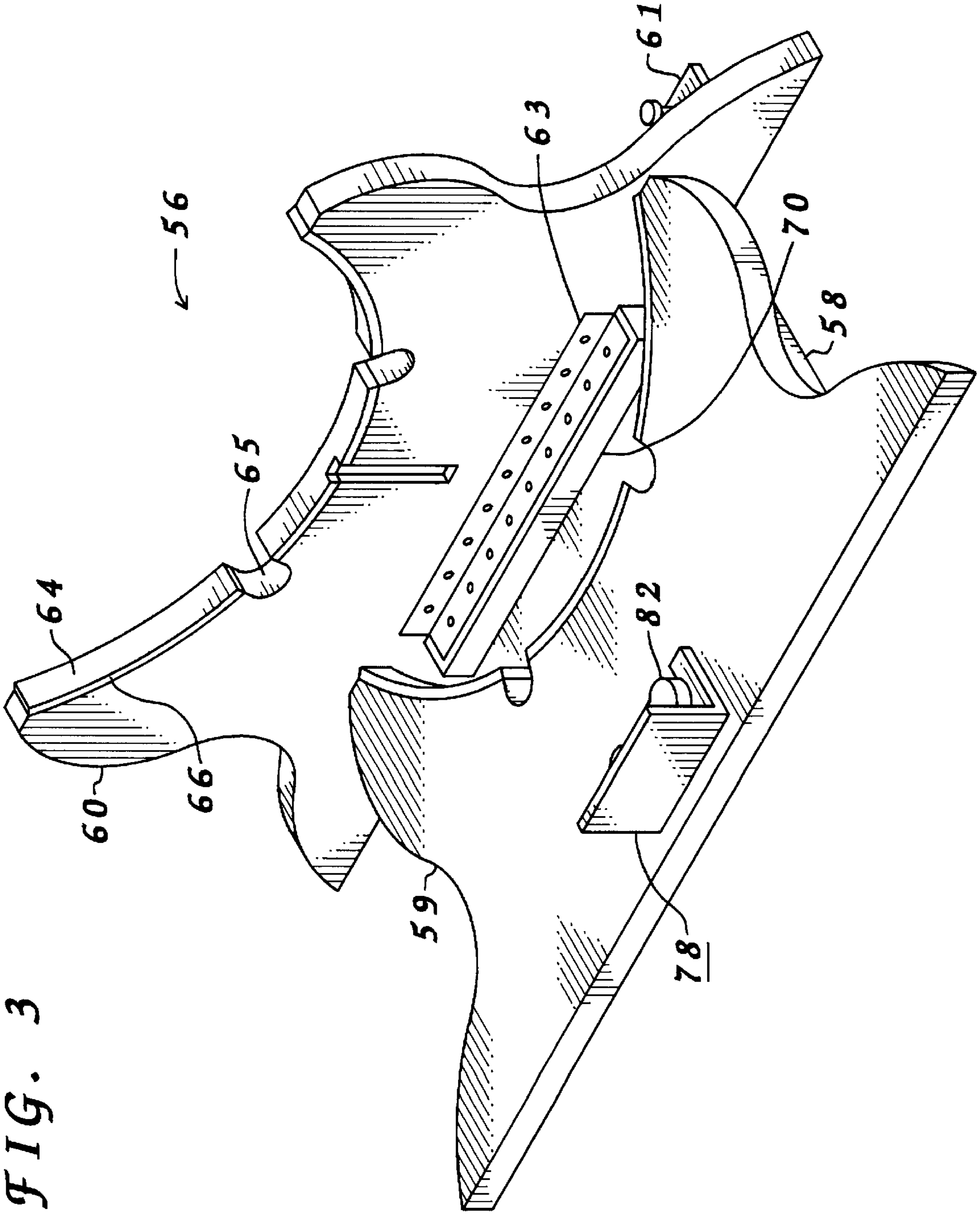
FIG. 3 is a perspective view of the transportable drum support assembly shown in FIG. 2 in an alternative configuration.
Figure 4:
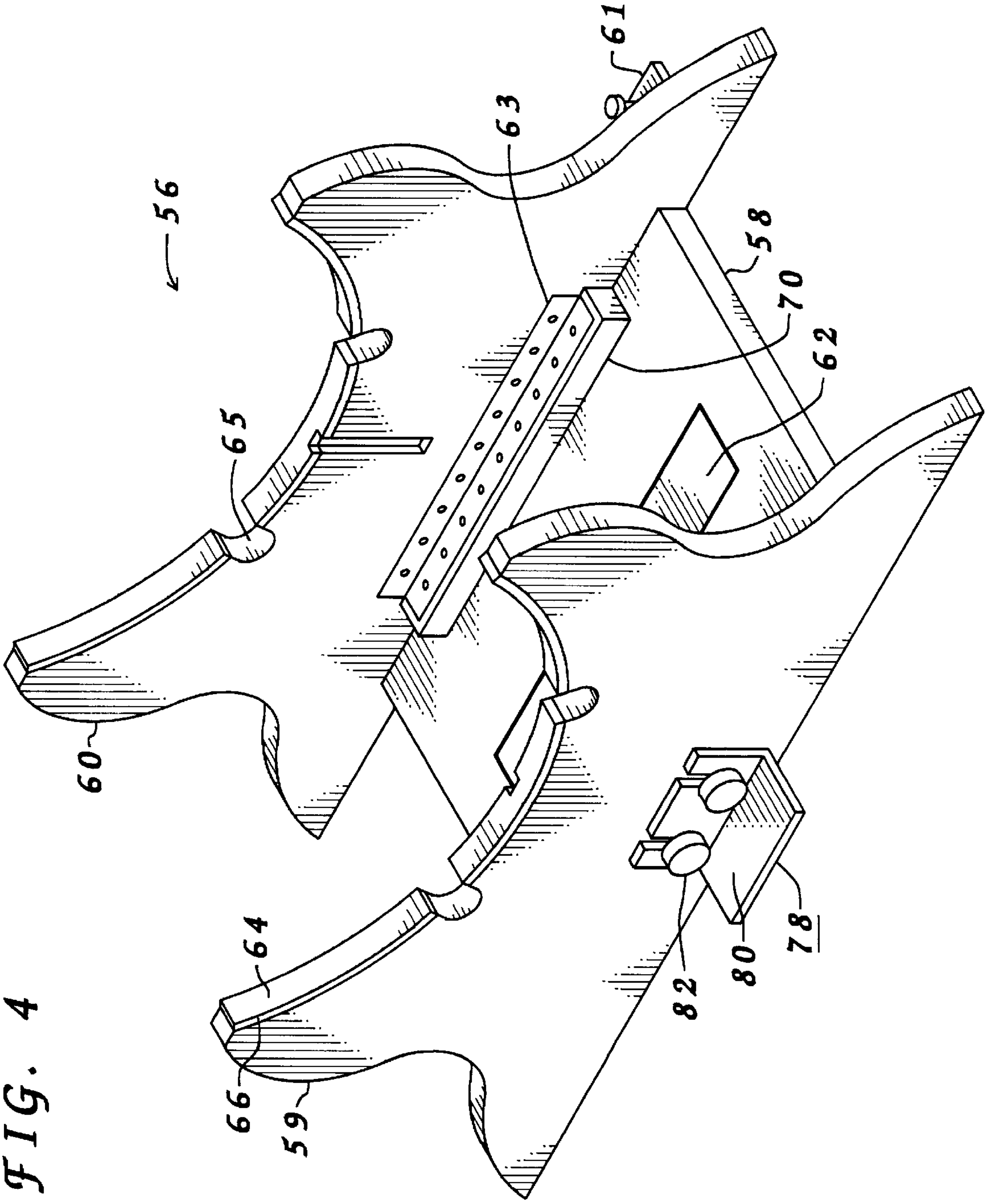
FIG. 4 is a perspective view of the transportable drum support assembly shown in FIG. 2 and FIG. 3 in an alternative configuration.

FIG. 2 depicts transportable drum support assembly 56 in a transportable configuration 67 wherein base 58, first support member 59 and second support member 60 are in a close contained relative orientation suitable for transport. While in transportable configuration 67 brace 62 is stored within a brace storage compartment 69, see FIG. 5.

FIG. 5 through FIG. 7 depict transportable drum support assembly 56 in a deployed configuration 68 suitable for supporting tom-tom drum 30. First support member 59 is pivotally attached to base 58 utilizing a hinge, not shown. When pivoted at the hinge first support member 59 may contact base 58, see FIG. 2 and FIG. 3. An elevation member 70 is rigidly attached to base 58. Second support member 60 is pivotally attached to elevation member 70 utilizing hinge 63. When pivoted at hinge 63 second support member 60 may contact first support member 59 while first support member 59 is contacting base 58, see FIG. 2.

A foot pedal assembly 72, as conventionally known in the art, is shown in FIG. 6 and FIG. 7. Foot pedal assembly 72, having a housing member 73, allows for impaction of percussion contact surface 42 of tom-tom drum 30 while tom-tom drum 30 is retained in transportable drum support assembly 56. A striker 74 on foot pedal assembly 72 is activated by a foot board 76 for pivotal transfer utilizing linkage means as exampled by a linkage 77 to provide the impaction following a partially horizontally oriented displacement. While foot pedal assembly 72 may be free standing relative to transportable drum support assembly 56, it is possible to provide for contact thereat, as depicted. A pedal plate 78 on foot pedal assembly 72 engages a pedal connection member 80 on transportable drum support assembly 56 to provide this contact. When contact is made, it is possible to provide for elevational height adjustment as exampled by an adjustment member 82 on pedal connection member 80.

Figure 8:
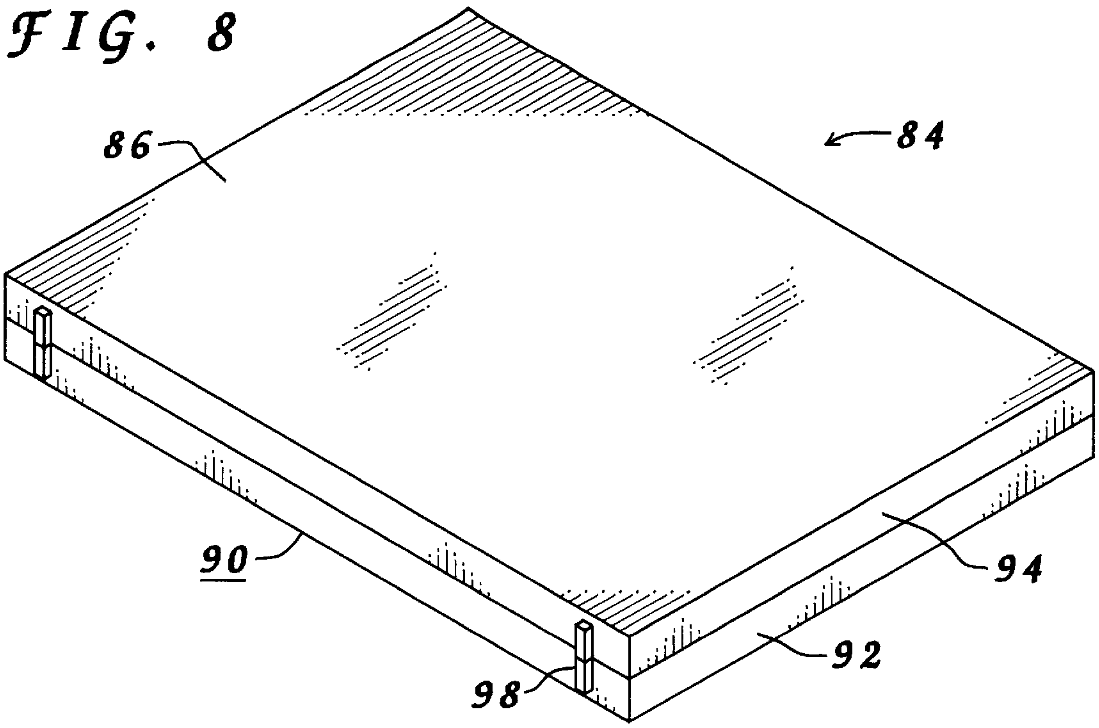
FIG. 8 is a perspective view of another embodiment of a transportable drum support assembly in a transportable configuration.
Figure 9:
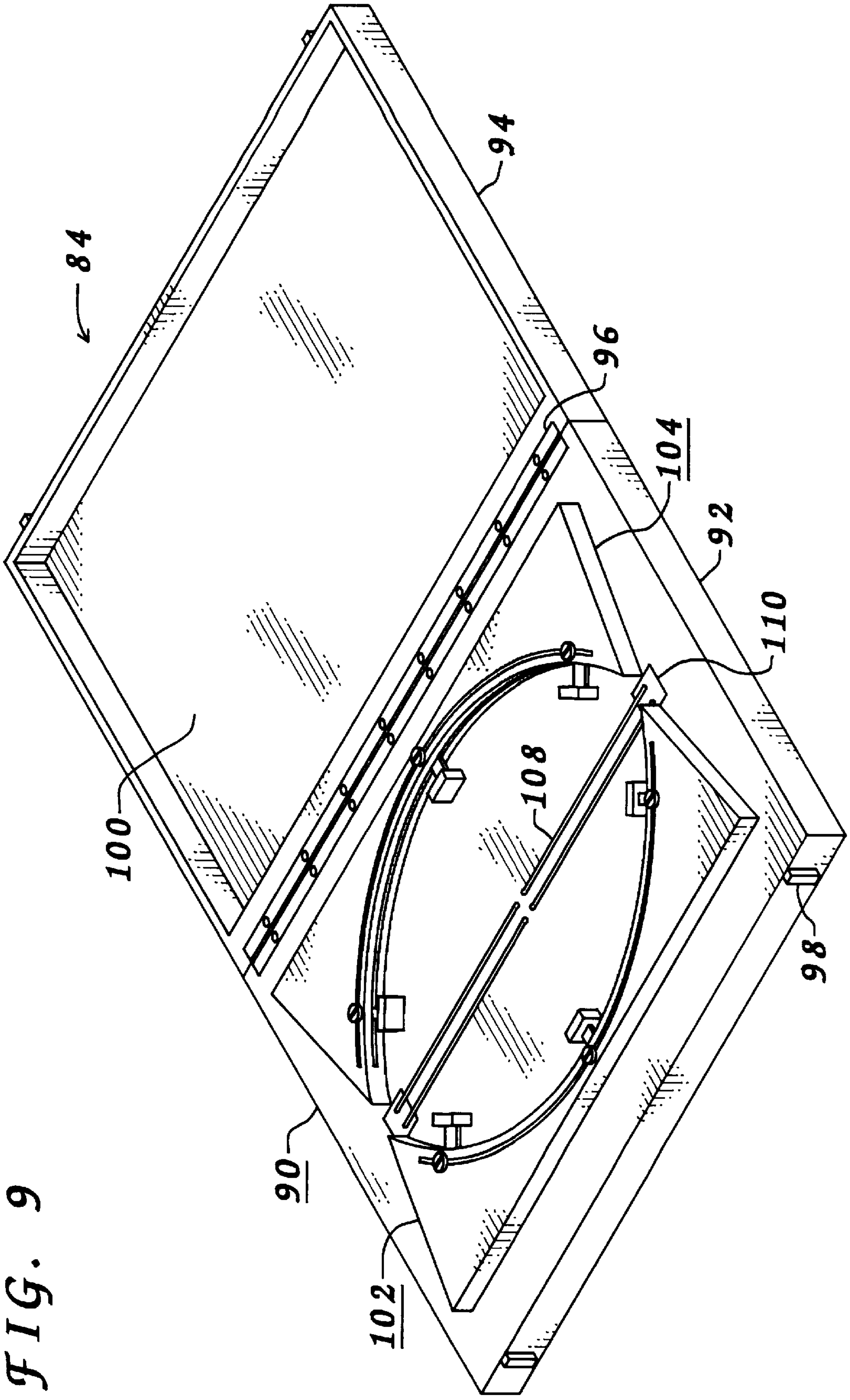
FIG. 9 is a perspective view of the unit shown in FIG. 8 with a cover thereon opened.
Figure 10:
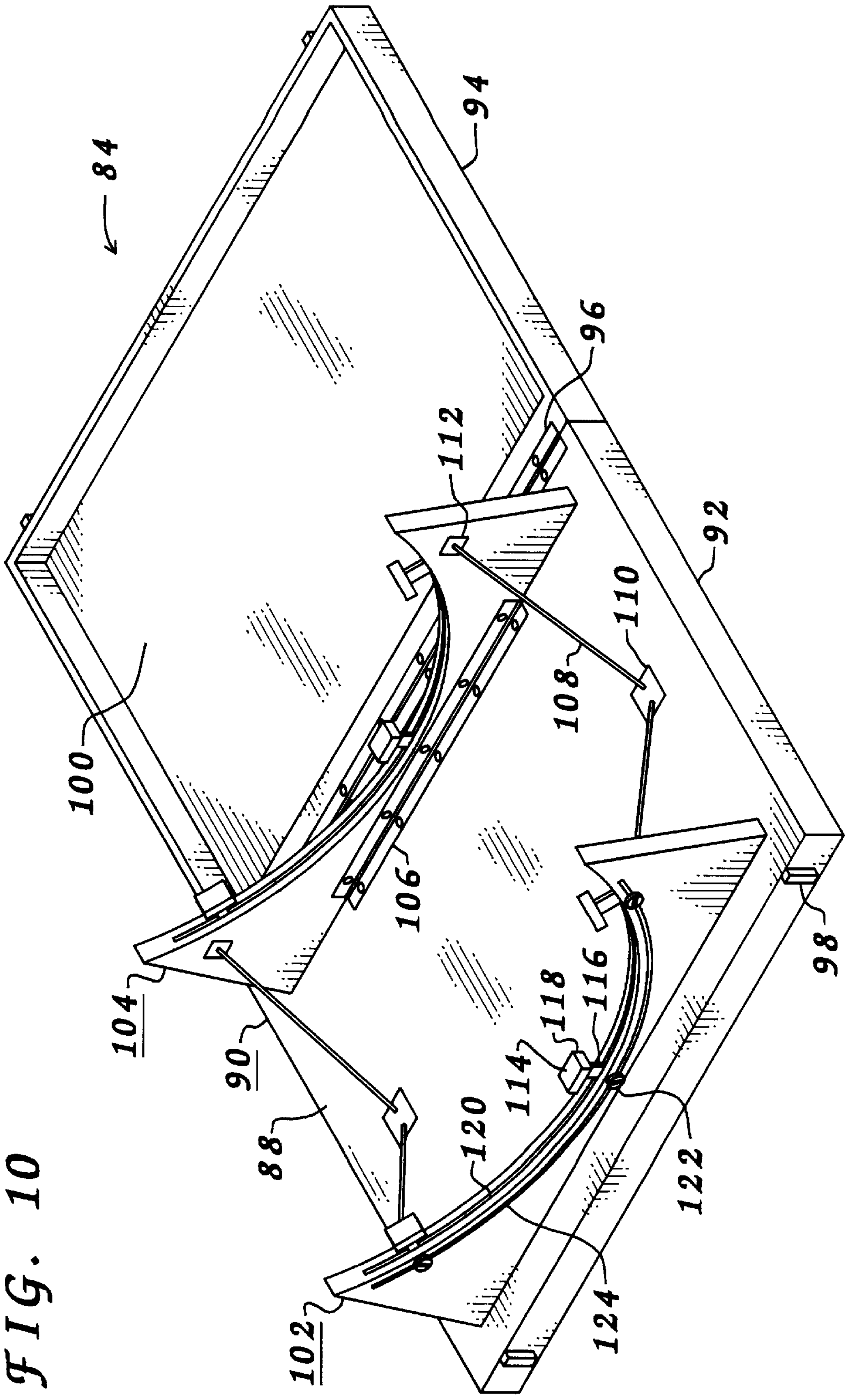
FIG. 10 is a perspective view of the unit shown in FIG. 8 and FIG. 9 in a deployed configuration.

FIG. 8 through FIG. 12 depict a transportable drum support assembly 84, or portions thereof, which provide for the transfer between a transportable configuration 86, shown in FIG. 8, and a deployed configuration 88, shown in FIG. 10. While in transportable configuration 86 transportable drum support assembly 84 may be easily transported while all of the essential elements are contained therein. Ample storage space may be provided within the confines of transportable drum support assembly 84 to provide for containment of other drumming related instruments as exampled by drum sticks and tuning tools, not shown in these views.

A housing 90 comprises a base member 92 and a cover member 94 which are pivotally connected using a hinge 96, see FIG. 9 and FIG. 10. Opposing latches 98, of any suitable type known in the art, provide for secure closure of housing 90 while in transportable configuration 86. Housing 90 has positioned therein various components which may cooperate to provide for support of a drum, not shown in these views. Preferably, base member 92 has substantial weight to provide for stable positioning on a horizontally oriented surface, not shown in these views. Therefore, base member 92 is depicted as being solid. Alternatively, base member 92 may have a recess area to at least partially provide for containment of the components mounted thereon. Cover member 94 has a recess area 100 which provides for receiving the components while in transportable configuration 86. While the various components are depicted as being positioned on base member 92, it is equally possible to provide for at least some of the components to be positioned on cover member 94. Such an arrangement providing for a much more compact dimensioning of the housing.

A first support member 102 and a second support member 104 are pivotally mounted to base member 92 utilizing hinges 106. First support member 102 and second support member 104 are retained in a spaced orientation by retaining rods 108 which are pivotally attached at one end to an anchor plate 110 and disconnectable attached at the opposing end to a coupling plate 112. While not in deployed configuration 88 retaining rods 108 are centrally positioned on base member 92, see FIG. 9.

Each support member 102 and 104 has a drum contact surface 114 which in this example is provided on a plurality of support posts 116. As previously described, it is preferred to provide for a padded contact with the drum. To that end each support post 116 has a compressible padding 118, see FIG. 11, attached thereto having drum contact surface 114 positioned thereon.

In order to allow transportable drum support assembly 84 to act with various sized drums it is desired to provide for variation in the point of contact by the various drum contact surfaces 114 on the respective support members 102 and 104. Therefore, each support post 116 is selectively displaceable within a placement track 120 and lockable at a desired location by a set screw 122 which is correspondingly displaceable within an anchor track 124. Such adjustment being required depending upon the placement of tension members 38, see FIG. 1, on the respective drum.

Figure 11:
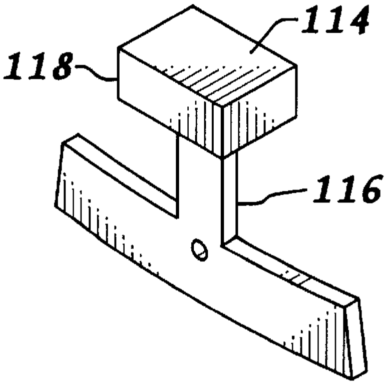
FIG. 11 is a perspective view of a support member.
Figure 12:
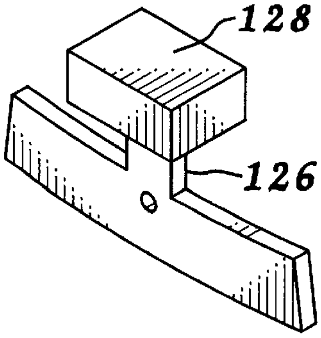
FIG. 12 is a perspective view of another embodiment of a support member.

Use of two (2) drum contact surfaces 114 on each support member 102 and 104 would allow for usage with drums of various diameters. Alternatively, as depicted, it is possible to provide for at least three (3) drum contact surfaces 114 on each support member 102 and 104. This arrangement provides a greater level of support to the drum. When three (3) or more drum contact surfaces 114 are on each support member 102 and 104 it is desirable to provide for elevational adjustment of at least one (1) drum contact surface 114 therewith in order to allow complete contact with drums of a given range of diameters. This adjustment may be variable elevational adjustment or, as depicted, may be provided by supplying select sets of support posts having differing elevational heights. FIG. 11 illustrates support post 116 as deployed with transportable drum support assembly 84. FIG. 12 depicts a support post 126 having a drum contact surface 128 which has a lower elevational height than that elevational height of drum contact surface 114 of support post 116. A set of support posts may be provided to accommodate a select set of drums having various diametric dimensions.

It is preferred to provide for transportable drum support assemblies to be contained within a housing for ease of transport. It is also possible to provide for such transportable assemblies to have a transportable configuration and a deployed configuration without having the enclosure feature.

FIG. 13 through FIG. 16 illustrate this principle in a holder support member 130 and a holder support member 132 which are essentially identical with the exception of a foot pedal positioning surface 134 on holder support member 132 which may accommodate placement of a foot pedal assembly, not shown in these views, thereon.

Figure 13:
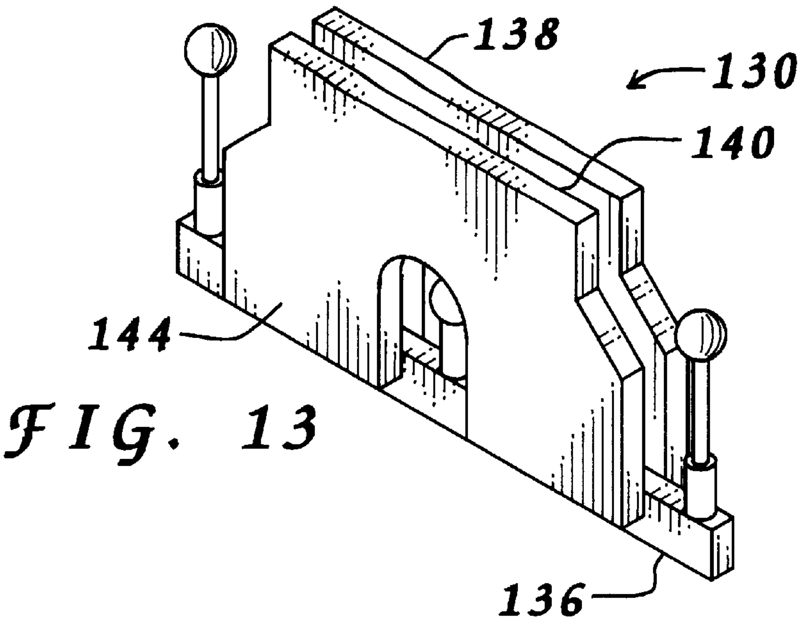
FIG. 13 is a perspective view of a holder support member in a closed orientation.
Figure 15:
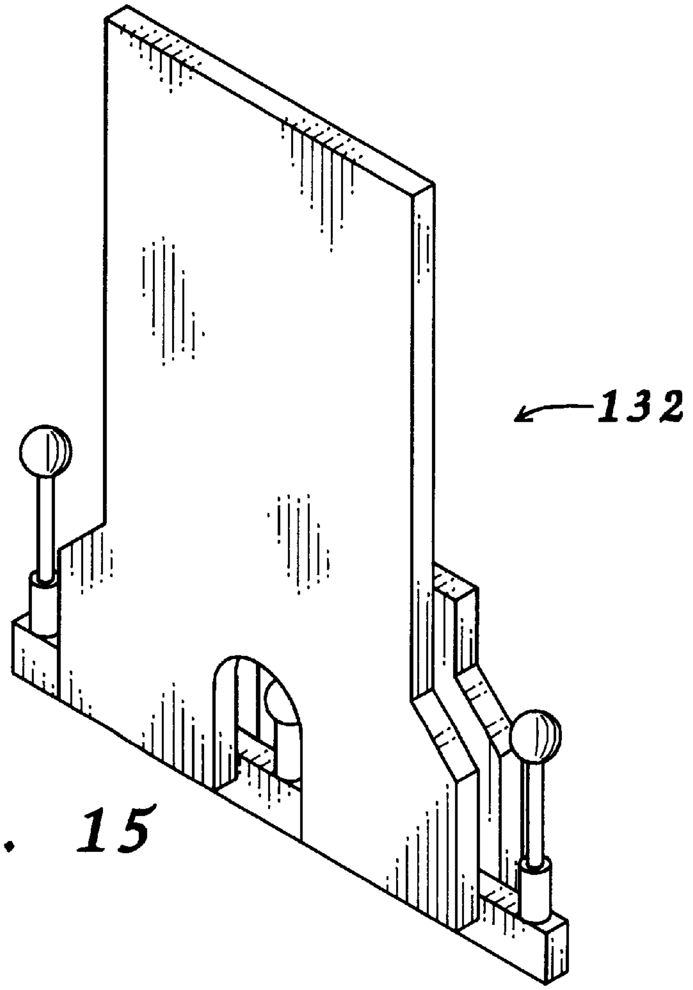
FIG. 15 is a perspective view of another embodiment of a holder support member in a closed orientation.
Figure 14:
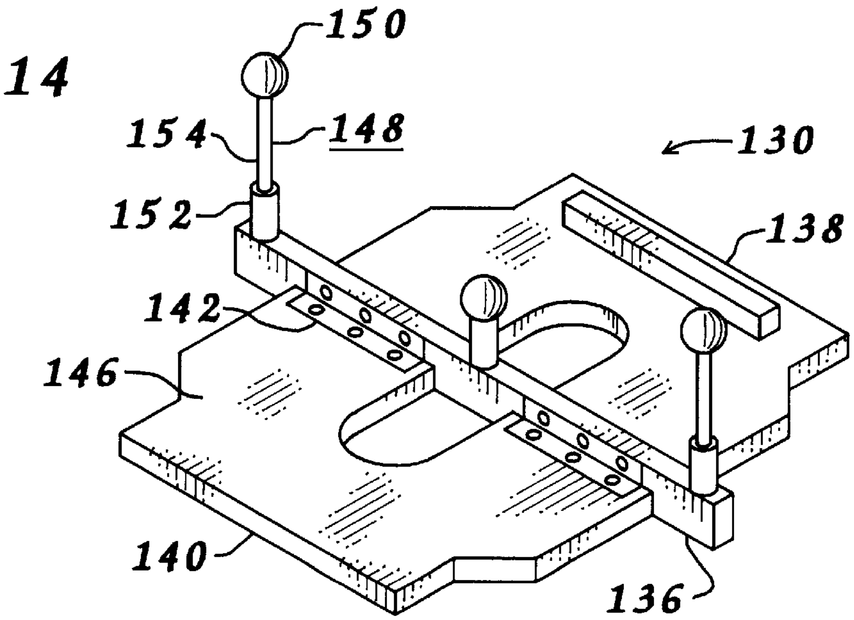
FIG. 14 is a perspective view of the holder support member shown in FIG. 13 in an open orientation.
Figure 16:
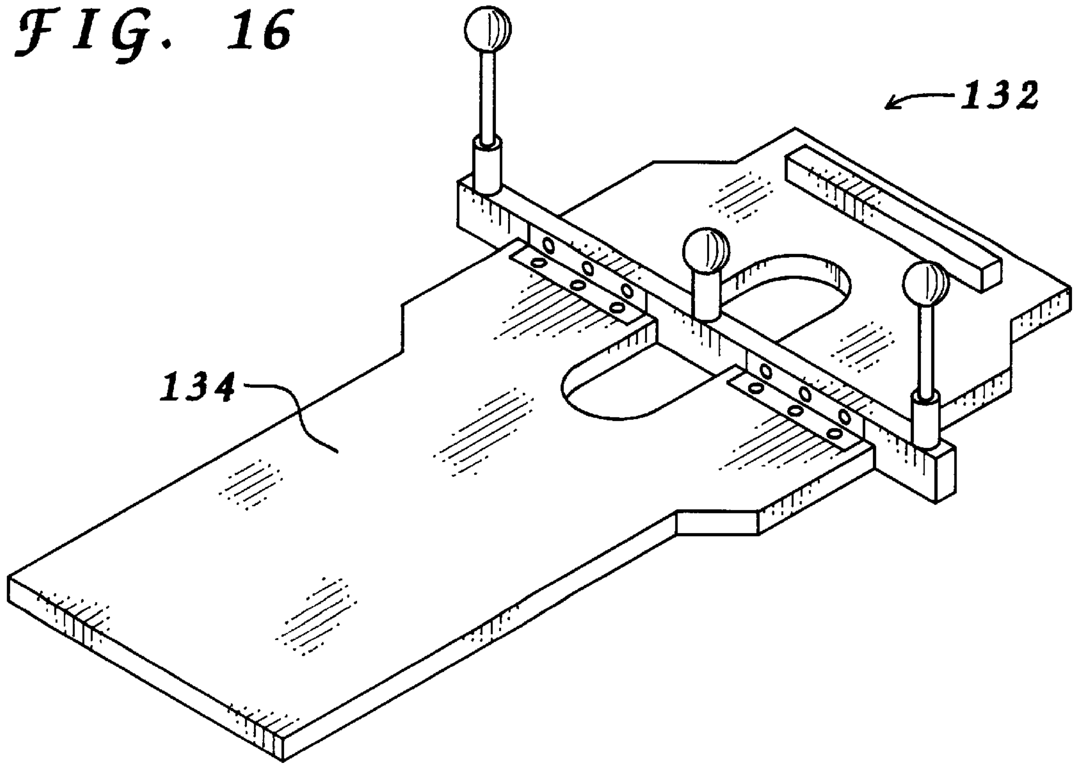
FIG. 16 is a perspective view of the holder support member shown in FIG. 15 in an open orientation.

Referring now to FIG. 13 and FIG. 14, holder support member 130 comprises a central assembly 136, a rearward floor contact member 138 and a forward floor contact member 140. Floor contact members 138 and 140 are pivotally attached to central assembly 136 utilizing hinges 142, which preferably are of a locking type as conventionally known in the art to enhance stability of the resultant assembly. Holder support member 130 has a closed orientation 144, shown in FIG. 13, and an open orientation 146, shown in FIG. 14. While in closed orientation 144 holder support member 130 may be easily transported. While in open orientation 146 holder support member 130 may provide at least partial support for a drum, not shown in these views, in a playable position.

Central assembly 136 has extending therefrom support members 148 which each have attached thereto a drum contact member 150. It is possible to have all drum contact members 150 elevationally fixed relative to central assembly 136. Alternatively, it is possible to provide for elevational adjustment to at least one (1) support member 148 to allow for support of drums of various diametric dimensions. Any method known in the art may be employed to provide this elevational adjustment as exampled by an adjustment base 152 which receives an adjustment shaft 154 which may be adjusted to vary the elevational height of drum contact member 150.

Figure 17A:
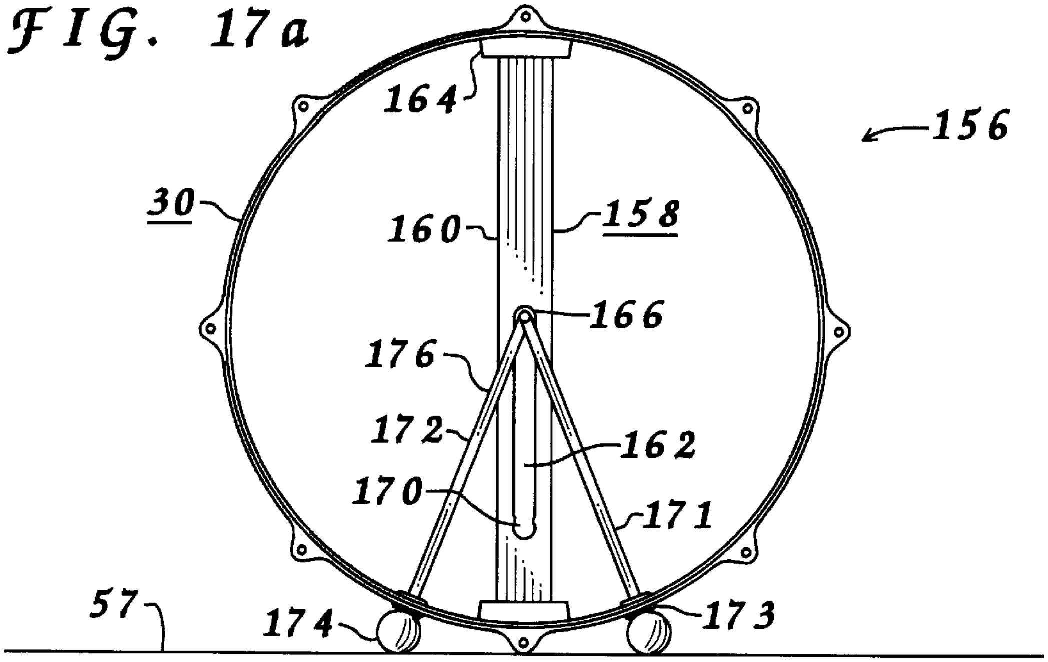
FIG. 17*a* is a rear plan view of another embodiment of a tom-tom drum holder assembly in a retracted orientation.
Figure 17B:
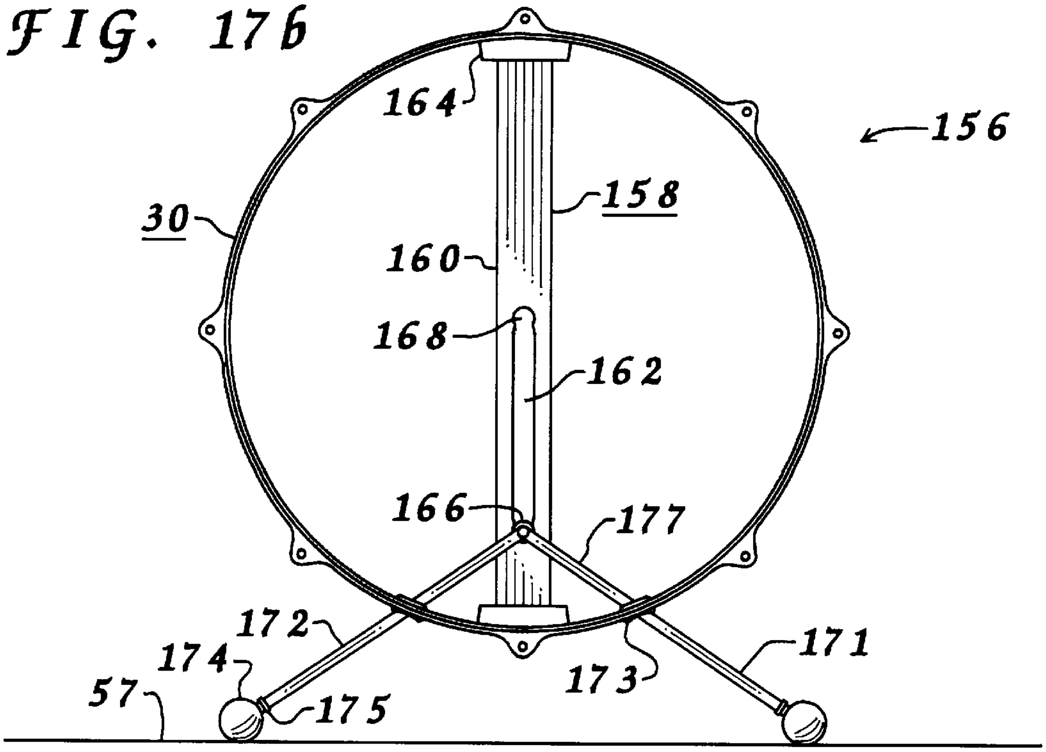
FIG. 17*b* is a rear plan view of the tom-tom drum holder assembly shown in FIG. 17*a* in an extended orientation.
Figure 21:
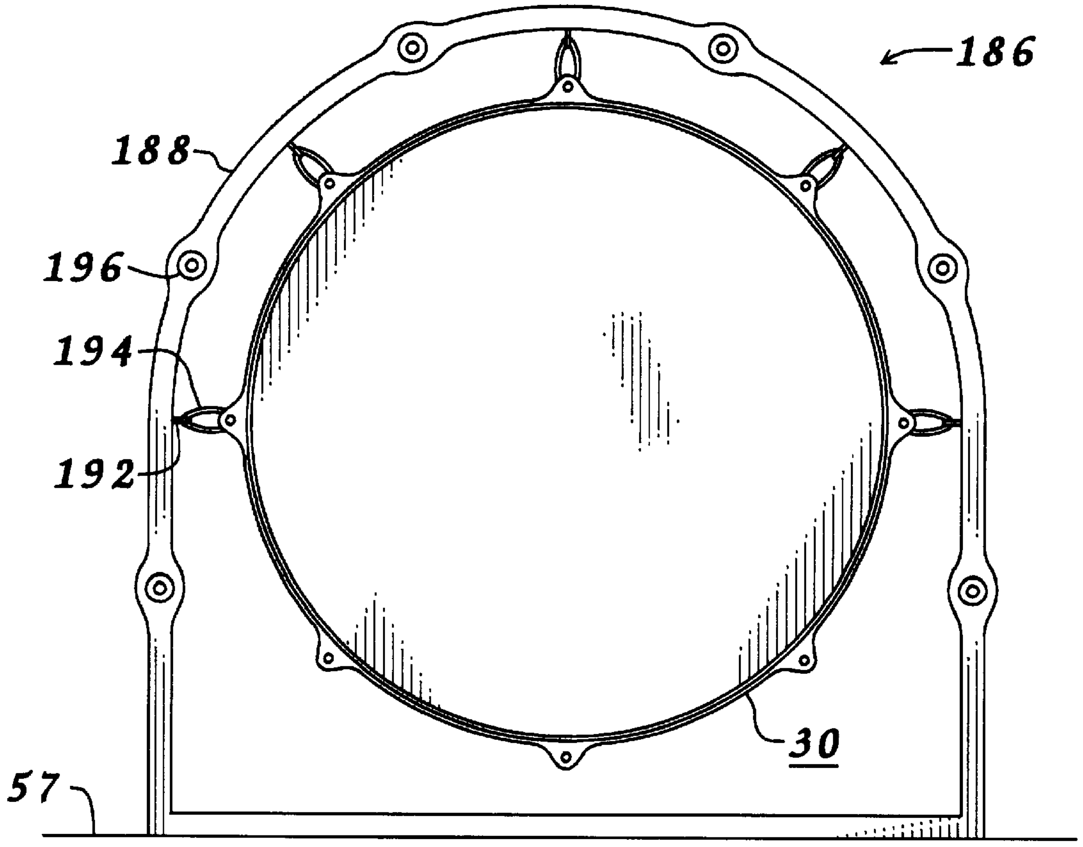
FIG. 21 is a rear plan view of still another embodiment of a tom-tom drum holder assembly formed of two (2) brackets shown in FIG. 19.
Figure 22:
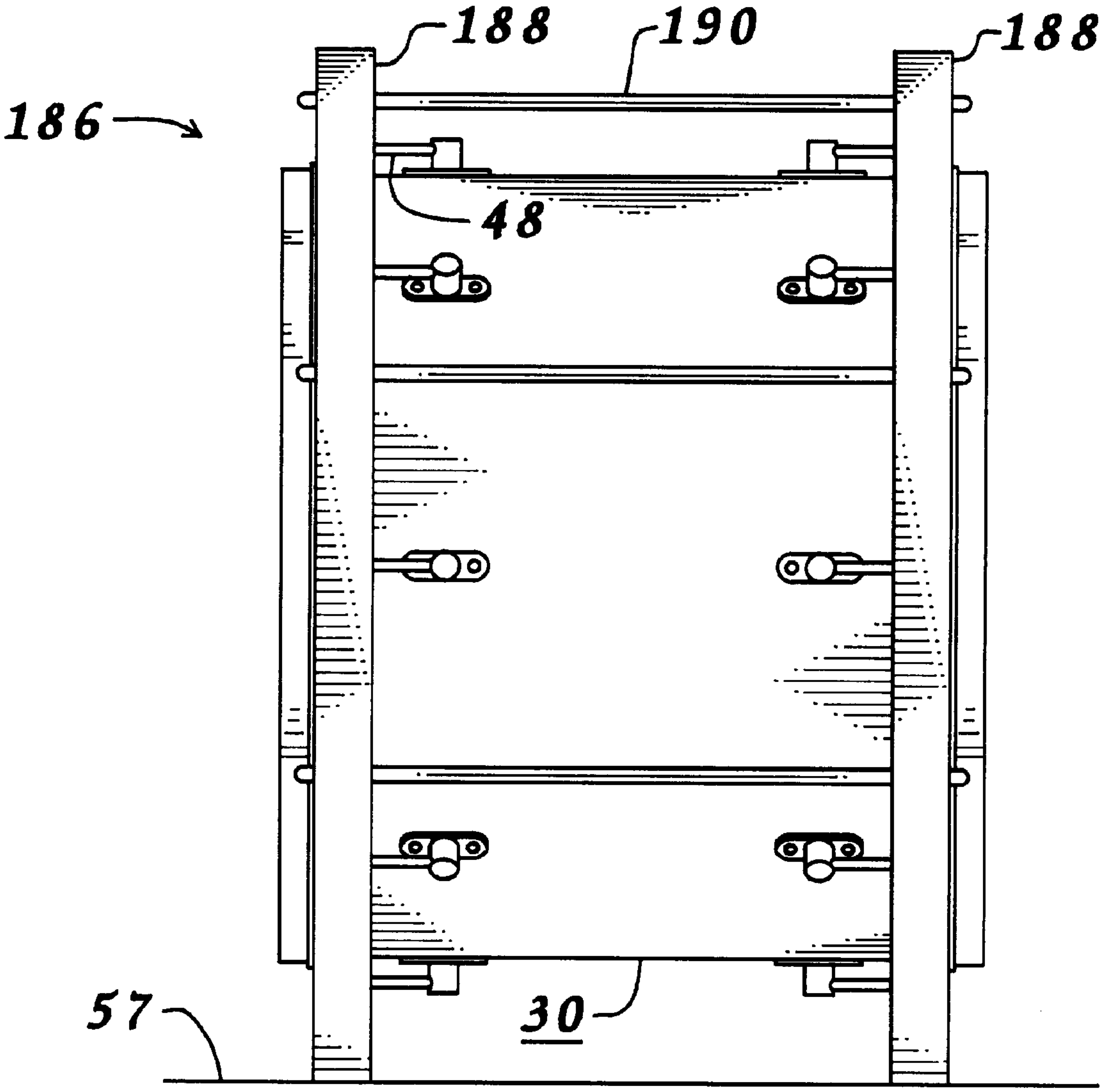
FIG. 22 is a side plan view of the tom-tom drum holder assembly shown in FIG. 21.

It is possible to provide for the support assemblies of the instant invention to be permanently attached to a specific drum. FIG. 17*a* and FIG. 17*b* example this principle by providing a tom-tom drum holder assembly 156 attached to tom-tom drum 30. Percussion contact surface 42, shown in FIG. 1, has been removed in these views to expose tom-tom drum holder assembly 156 installed within tom-tom drum 30. Tom-tom drum holder assembly 156 comprises at least one (1) support assembly 158. It is possible to provide the desired support utilizing a single support assembly 158 positioned at one end of tom-tom drum 30 while the opposing end of tom-tom drum 30 rests on horizontally oriented surface 57. Preferably, as depicted, tom-tom drum 30 is supported generally parallel to horizontally oriented surface 57, see FIG. 17*b*, by having two (2) support assemblies 158 installed at opposing ends of tom-tom drum 30.

Each support assembly 158 has a central guide member 160 having a guide channel 162 thereon. Central guide member 160 is secured to tom-tom drum 30 to remain stationary therein. Central guide member 160 is depicted as being anchored at opposing ends 164 to tom-tom drum 30. Displaceably installed within guide channel 162 is a slide member 166 which has a retracted locked position 168, see FIG. 17*b*, and an extended locked position 170, see FIG. 17*a*. Pivotally attached to slide member 166 are a first support leg 171 and a second support leg 172 which are displaced relative to tom-tom drum 30 during transfer of slide member 166 between retracted locked position 168 and extended locked position 170. Each support leg 171 and 172 passes through a guide 173 attached to tom-tom drum 30. Each support leg 171 and 172 has a floor contact member 174 attached at a distal end thereon. In order to ensure that floor contact member 174 of support assembly 158 remain in close proximity to tom-tom drum 30 a locking member 175 is positioned on each support leg 171 and 172 in close proximity to floor contact member 174. Locking member 175 cooperates with structures within guide 173, not shown, to ensure a secure retention of the respective support leg 171 or 172 adjacent tom-tom drum 30.

Tom-tom drum holder assembly 156 has a retracted orientation 176, shown in FIG. 17*a*, and an extended orientation 177, shown in FIG. 17*b*. Retracted orientation allows convenient transport of tom-tom drum 30. Extended orientation 177 allows positioning of tom-tom drum 30 in a playable position on horizontally oriented surface 57 for play utilizing a foot pedal assembly.

FIG. 18*a* and FIG. 18*b* depict a drum support member 178 which comprises a coupling member 179 and a support member 180. Coupling member 179 penetrates body member 32 of tom-tom drum 30. Support member 180 slidably engages coupling member 179. Support member 180 has attached thereto a floor contact member 181 which may engage horizontally oriented surface 57. In usage at least one (1) pair of drum support members 178 will be deployed at one end of tom-tom drum 30 and preferably one (1) pair of drum support members 178 will be deployed at each end of tom-tom drum 30.

Each drum support member 178 has a retracted orientation 182, shown in FIG. 18*a*, and an extended orientation 183, shown in FIG. 18*b*. A locking member 184 positioned within coupling member 179 allows for a retention of support member 180 in any desired positional placement relative to coupling member 179 including retracted orientation 182 and extended orientation 183.

FIG. 19 through FIG. 22 depict a tom-tom drum holder assembly 186 which supports tom-tom drum 30 in a suspended state. Tom-tom drum holder assembly 186 comprises two (2) brackets 188 and a plurality of connection rods 190. Each bracket 188 has extending inward therefrom a series of hooks 192 which receive a loop member 194 attached to tom-tom drum 30. Each loop member 194 may be temporarily attached to tom-tom drum 30 or may be attached to remain with tom-tom drum 30. While several attachment methods exist, a particularly expedient method of attachment is to encircle tension bar 48.

Each bracket 188 has a series of matching rod mounts 196 which receive an end 198 of connection rod 190. In order to ensure the structural integrity of tom-tom drum holder assembly 186 each rod mount 196 has structures therein, not shown, which passively engage a locking member 200 of connection rod 190. Such engagement is of sufficient strength to prevent accidental displacement of connection rod 190 from rod mount 196.

Tom-tom drum holder assembly 186 therefore may support tom-tom drum 30 on horizontally oriented surface 57 in a playable position to allow play utilizing a foot pedal assembly, not shown in these views.

Figure 23:
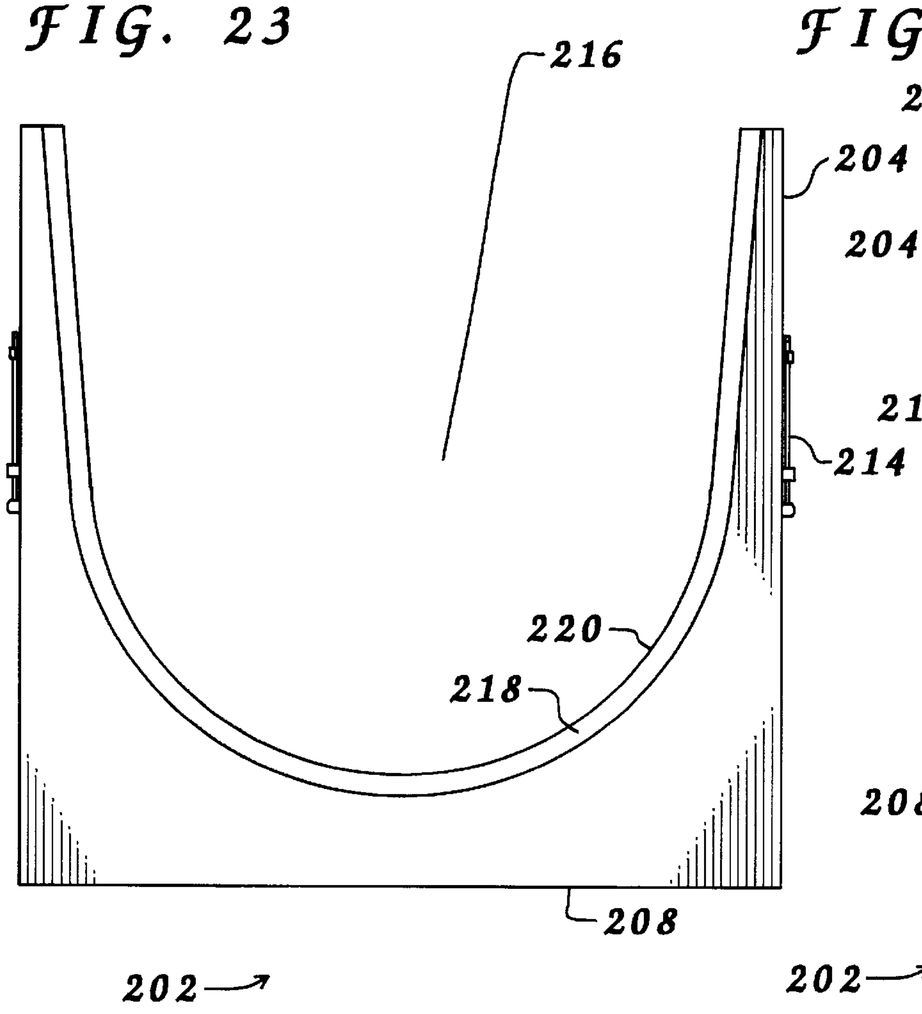
FIG. 23 is a rear plan view of another embodiment of a transportable drum support assembly in a transportable configuration.
Figure 24:
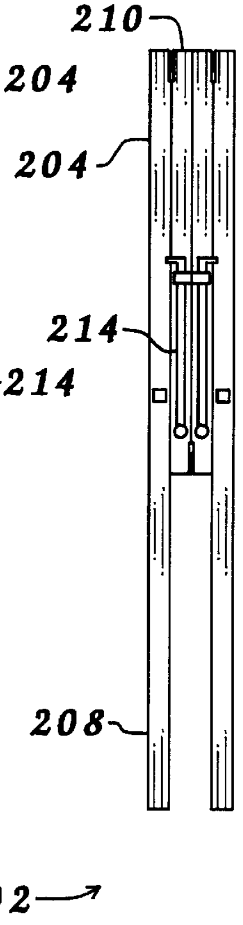
FIG. 24 is a side plan view of the transportable drum support assembly shown in FIG. 23 also in the transportable configuration.
Figure 26:
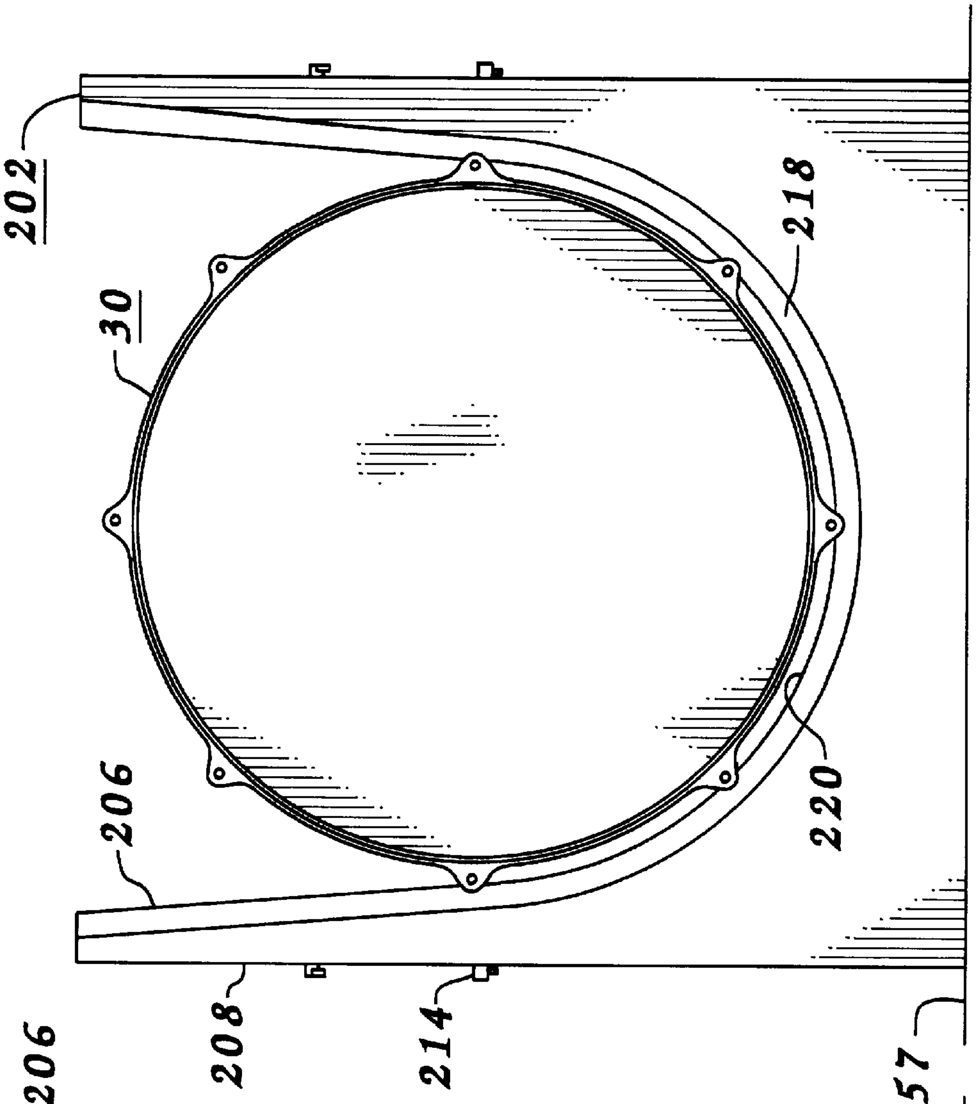
FIG. 26 is a rear plan view of the transportable drum support assembly shown in FIG. 25.
Figure 25:
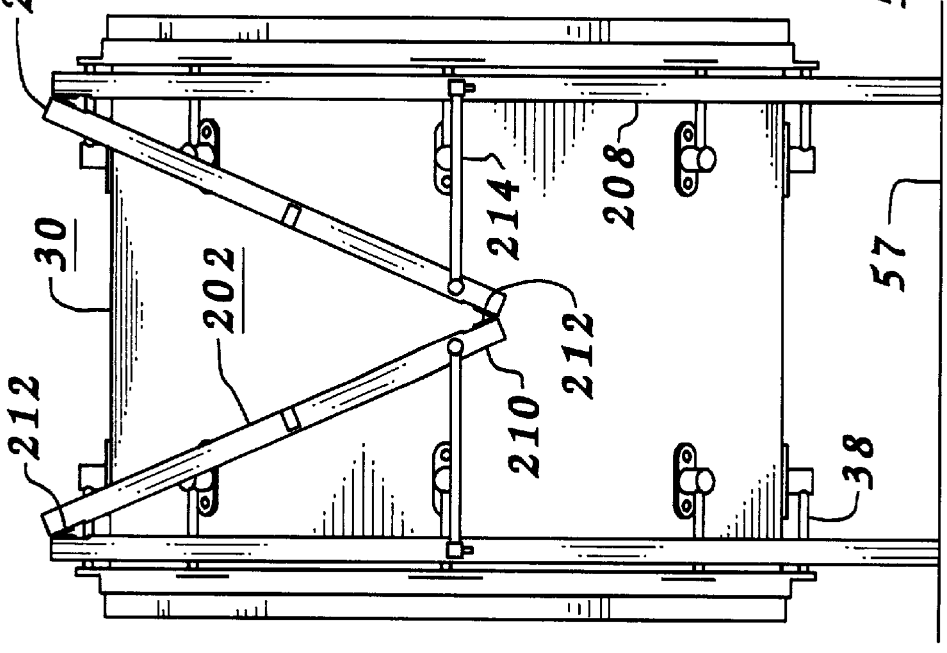
FIG. 25 is a side plan view of the transportable drum support assembly shown in FIG. 23 and FIG. 24 in a deployed configuration with the tom-tom drum shown in FIG. 1 installed thereon.

FIG. 23 through FIG. 26 depict a transportable drum support assembly 202 having a transportable configuration 204, shown in FIG. 23 and FIG. 24, and a deployed configuration 206, shown in FIG. 25 and FIG. 26. Transportable drum support assembly 202 comprises opposing support members 208 and support arms 210.

Support arms 210 are each pivotally attached to a respective support member 208 utilizing a hinge 212. Support arms 210 are pivotally attached one to the other utilizing hinge 212. A locking arm 214 is pivotally attached to each support arm 210 to allow for a locking of a respective support arm 210 relative to a respective support member 208. Such locking allowing for a retention of transportable drum support assembly 202 in deployed configuration 206.

Each support member 208 has a drum positioning area 216 therein which receives tom-tom drum 30 therein. A compressible pad 218 has a drum support surface 220 extending therefrom to receive tom-tom drum 30 thereon. In this embodiment tension members 38 of tom-tom drum 30 rest on drum support surface of support members 208.

Transportable drum support assembly 202 therefore may support tom-tom drum 30 on horizontally oriented surface 57 in a playable position to allow play utilizing a foot pedal assembly, not shown in these views.

Figure 27:
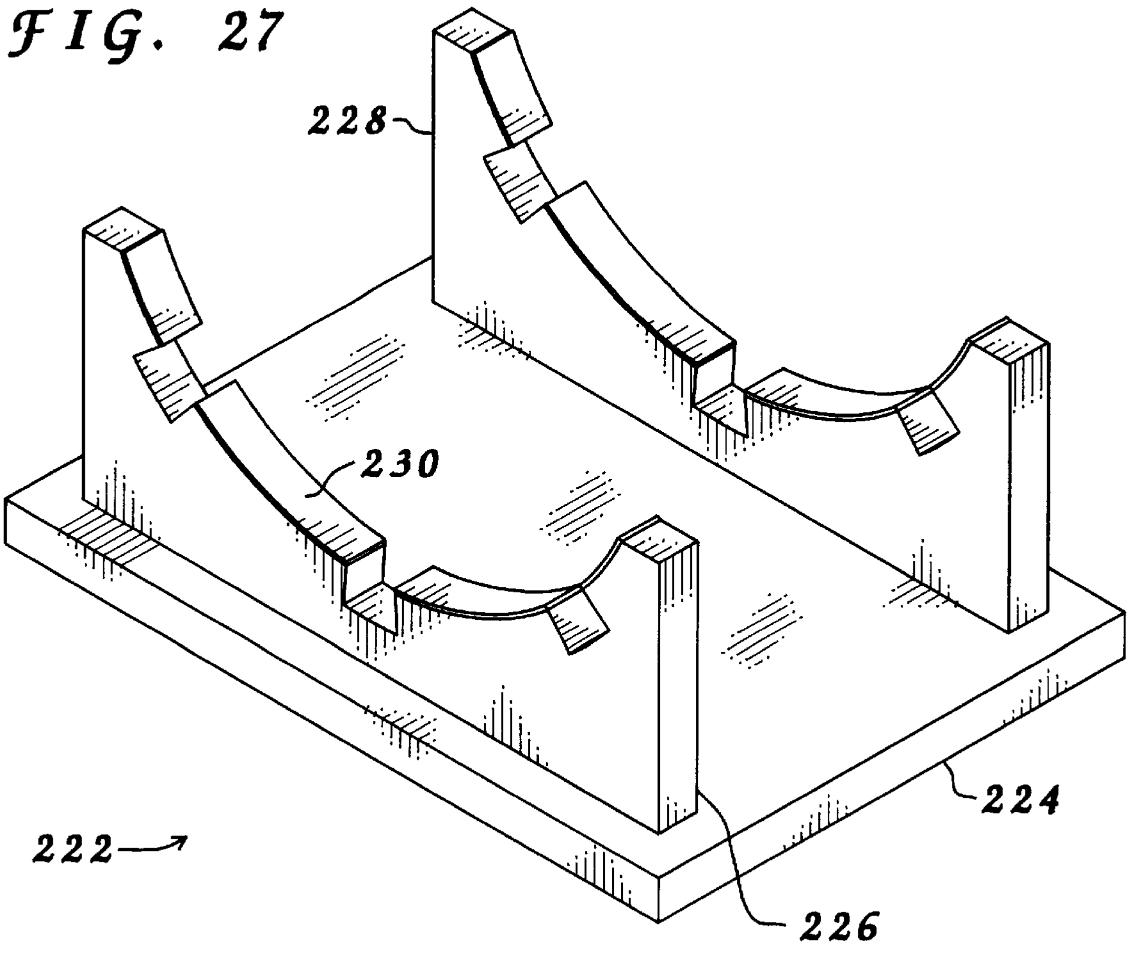
FIG. 27 is a perspective view of another embodiment of a tom-tom drum holder assembly.
Figure 28:
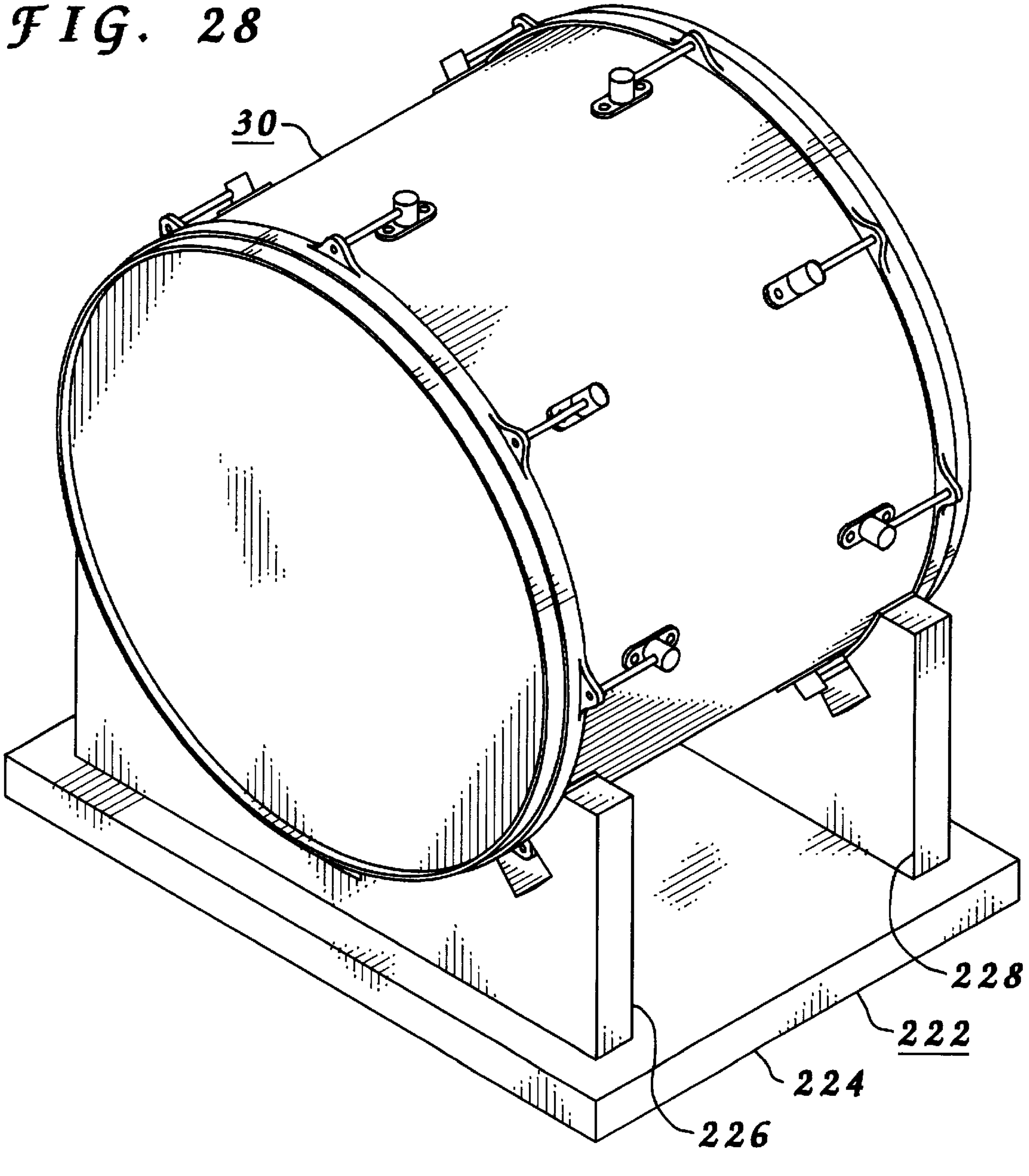
FIG. 28 is a perspective view of the tom-tom drum holder assembly shown in FIG. 27 with the tom-tom drum shown in FIG. 1 installed thereon.

FIG. 27 and FIG. 28 depict a tom-tom drum holder assembly 222 which fulfills the requirements of the instant invention while having no moving parts. A base 224 has rigidly attached thereto in spaced relationship a first support member 226 and a second support member 228. Each support member 226 and 228 have a drum contact surface 230 which may contact tom-tom drum 30, see FIG. 28, and provide positional support thereto.

Numerous conceptual examples of the various features have been provided above. It is understood that the various features may be easily transferred from the conceptual embodiment with which a specific feature is depicted to other conceptual embodiments, including those disclosed herein.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A transportable drum support assembly having a transportable configuration and a deployed configuration, the transportable configuration to provide for ready transport of the transportable drum support assembly, the deployed configuration to provide for a stationary positioned support of a drum of a musical type, the transportable drum support assembly comprising:

a) a first support member having a drum contact surface;

b) a second support member having a drum contact surface;

c) a connection assembly contacting the first support member and the second support member while the transportable drum support assembly is in the deployed configuration wherein the drum contact surface of the first support member and the drum contact surface of the second support member are in a spaced orientation, the deployed configuration to provide for the drum to be supported by the drum contact surface of the first support member and the drum contact surface of the second support member at opposing ends of the drum while a percussion contact surface of the drum situated at one end of the drum is supported in a generally vertically oriented plane and the percussion contact surface may be impacted by a striker following at least a partially horizontally oriented displacement of the striker;

d) transfer means to provide for transferring the transportable drum support assembly between the transportable configuration and the deployed configuration, the transportable configuration to provide for the first support member, the second support member and the connection assembly to be in a close orientation for ready transport of the transportable drum support assembly;

whereby, while in the transportable configuration the transportable drum support assembly may be readily transported and while in the deployed configuration the transportable drum support assembly may support the drum while the percussion contact surface of the drum is supported in the generally vertically oriented plane where the percussion contact surface may be impacted by the striker following at least the partially horizontally oriented displacement of the striker.

2. The transportable drum support assembly defined in claim 1 wherein the drum of the musical type is a tom-tom type drum.

3. The transportable drum support assembly defined in claim 1 further comprising a foot pedal attachment member attached to the transportable drum support assembly, the foot pedal attachment member to provide for attachment of a foot pedal assembly to the transportable drum support assembly.

4. The transportable drum support assembly defined in claim 1 wherein the first support member hingedly attaches to the connection assembly and the second support member hingedly attaches to the connection assembly.

5. The transportable drum support assembly defined in claim 1 wherein the connection assembly at least partially forms a carrying case, the carrying case to contain the first support member and the second support member while the transportable drum support assembly is in the transportable configuration.

6. A transportable drum support assembly having a transportable configuration and a deployed configuration, the transportable configuration to provide for ready transport of the transportable drum support assembly, the deployed configuration to provide for a stationary positioned support of a drum of a musical type, the drum having a body member having a percussion end, a distal end and a radially disposed wall member separating the percussion end and the distal end, the transportable drum support assembly comprising:

a) a first support assembly comprising:

1) a drum contact surface to provide for contact with the drum in close proximity to the percussion end while the transportable drum support assembly is in the deployed configuration;

2) a floor contact surface to provide for contact with a floor while the transportable drum support assembly is in the deployed configuration, the floor generally horizontally disposed;

b) a second support assembly comprising:

1) a drum contact surface to provide for contact with the drum in close proximity to the distal end while the transportable drum support assembly is in the deployed configuration;

2) a floor contact surface to provide for contact with the floor while the transportable drum support assembly is in the deployed configuration;

c) stabilization means to provide for a cooperation between the first support assembly and the second support assembly while the transportable drum support assembly is in the deployed configuration, the deployed configuration to provide for the first support assembly and the second support assembly to be in a spaced orientation wherein the drum may be supported by the drum contact surface of the first support assembly and the drum contact surface of the second support assembly at opposing ends of the drum while a percussion contact surface of the drum situated at the percussion end of the drum is supported in a generally vertically oriented plane and the percussion contact surface may be impacted by a striker following at least a partially horizontally oriented displacement of the striker;

d) transfer means to provide for transferring the transportable drum support assembly between the transportable configuration and the deployed configuration, the transportable configuration to provide for the first support assembly and the second support assembly to be in a close orientation for ready transport of the transportable drum support assembly;

whereby, while in the transportable configuration the transportable drum support assembly may be readily transported and while in the deployed configuration the transportable drum support assembly may support the drum while the percussion contact surface of the drum is supported in the generally vertically oriented plane where the percussion contact surface may be impacted by the striker following at least the partially horizontally oriented displacement of the striker.

7. The transportable drum support assembly defined in claim 6 wherein the drum of the musical type is a tom-tom type drum.

8. The transportable drum support assembly defined in claim 6 further comprising a foot pedal attachment member attached to the transportable drum support assembly, the foot pedal attachment member to provide for attachment of a foot pedal to the transportable drum support assembly.

9. The transportable drum support assembly defined in claim 6 wherein the first support assembly is detached from the second support assembly while the transportable drum support assembly is in the deployed configuration.

10. The transportable drum support assembly defined in claim 6 wherein the first support assembly and the second support assembly are attached together while the transportable drum support assembly is in the deployed configuration.

11. A tom-tom drum holder assembly to provide for retaining a tom-tom drum, the tom-tom drum comprising a body member and a percussion contact surface, the body member having a percussion end, a distal end and a radially disposed wall member separating the percussion end and the distal end, the percussion contact surface positioned on the percussion end of the body member, the tom-tom drum holder assembly comprising:

a) a holder support member to provide for supporting the tom-tom drum holder assembly on a horizontally oriented surface;

b) a tom-tom drum support member to provide for supporting the tom-tom drum;

c) retention means to provide for a cooperation between the holder support member and the tom-tom drum support member to retain the tom-tom drum relative to the horizontally oriented surface wherein the percussion contact surface of the tom-tom drum is generally perpendicular to the horizontally oriented surface for impacting of the percussion contact surface by a striker following at least a partially horizontally oriented displacement of the striker;

d) a connection member to provide for rigid connection of the tom-tom drum support member to the tom-tom drum;

whereby the tom-tom drum is supported by the tom-tom drum support member while the holder support member supports the tom-tom drum holder assembly on the horizontally oriented surface and the cooperation between the tom-tom drum support member and the holder support member retain the tom-tom drum relative to the horizontally oriented surface where the percussion contact surface of the tom-tom drum is generally perpendicular to the horizontally oriented surface.

12. A tom-tom drum holder assembly to provide for retaining a tom-tom drum, the tom-tom drum comprising a body member and a percussion contact surface, the body member having a percussion end, a distal end and a radially disposed wall member separating the percussion end and the distal end, the percussion contact surface positioned on the percussion end of the body member, the tom-tom drum holder assembly comprising:

a) a holder support member to provide for supporting the tom-tom drum holder assembly on a horizontally oriented surface;

b) a tom-tom drum support member to provide for supporting the tom-tom drum;

c) retention means to provide for a cooperation between the holder support member and the tom-tom drum support member to retain the tom-tom drum relative to the horizontally oriented surface wherein the percussion contact surface of the tom-tom drum is generally perpendicular to the horizontally oriented surface for impacting of the percussion contact surface by a striker following at least a partially horizontally oriented displacement of the striker;

d) a first support member wherein the first support member supports the tom-tom drum in close proximity to the percussion end;

e) a second support member wherein the second support member supports the tom-tom drum in close proximity to the distal end;

whereby the tom-tom drum is supported by the tom-tom drum support member while the holder support member supports the tom-tom drum holder assembly on the horizontally oriented surface and the cooperation between the tom-tom drum support member and the holder support member retain the tom-tom drum relative to the horizontally oriented surface where the percussion contact surface of the tom-tom drum is generally perpendicular to the horizontally oriented surface.

13. A tom-tom drum holder assembly to provide for retaining a tom-tom drum, the tom-tom drum comprising a body member and a percussion contact surface, the body member having a percussion end, a distal end and a radially disposed wall member separating the percussion end and the distal end, the percussion contact surface positioned on the percussion end of the body member, the tom-tom drum holder assembly comprising:

a) a holder support member to provide for supporting the tom-tom drum holder assembly on a horizontally oriented surface;

b) a tom-tom drum support member to provide for supporting the tom-tom drum;

c) retention means to provide for a cooperation between the holder support member and the tom-tom drum support member to retain the tom-tom drum relative to the horizontally oriented surface wherein the percussion contact surface of the tom-tom drum is generally perpendicular to the horizontally oriented surface for impacting of the percussion contact surface by a striker following at least a partially horizontally oriented displacement of the striker;

d) a foot pedal attachment member connected to the tom-tom drum holder assembly, the foot pedal attachment member comprising:

1) a foot pedal connection member to provide for engagement of a foot pedal;

2) height adjustment means to provide for an elevational adjustment of the foot pedal connection member relative to the tom-tom drum holder assembly;

whereby the tom-tom drum is supported by the tom-tom drum support member while the holder support member supports the tom-tom drum holder assembly on the horizontally oriented surface and the cooperation between the tom-tom drum support member and the holder support member retain the tom-tom drum relative to the horizontally oriented surface where the percussion contact surface of the tom-tom drum is generally perpendicular to the horizontally oriented surface.

14. A method of utilizing a tom-tom drum as a replacement for a floor positioned bass drum wherein the tom-tom drum is impacted by a striker following activation of the striker by a foot operated pedal assembly, the method comprising the steps of:

a) providing a tom-tom drum having:
   1) a body member having a percussion end, a distal end and a radially disposed wall member separating the percussion end and the distal end;
   2) a percussion contact surface positioned at the percussion end;

b) providing a tom-tom drum holder assembly comprising:
   1) a holder support member to provide for supporting the tom-tom drum holder assembly on a horizontally oriented surface;
   2) a tom-tom drum support member having a connection member to provide for rigid connection of the tom-tom drum support member to the tom-tom drum the tom-tom drum support member to provide for supporting the tom-tom drum;
   3) retention means to provide for a cooperation between the holder support member and the tom-tom drum support member to retain the tom-tom drum relative to the horizontally oriented surface wherein the percussion contact surface of the tom-tom drum is generally perpendicular to the horizontally oriented surface for impacting of the percussion contact surface by the striker following at least a partially horizontally oriented displacement of the striker;

c) providing a foot pedal assembly comprising:
   1) a housing member;
   2) a foot contact surface pivotally attached to the housing member;
   3) a striker member displaceably attached to the housing member, the striker member to provide for impact contact with the percussion contact surface of the tom-tom drum;
   4) linkage means to provide for displacement of the striker member in response to pressure applied to the foot contact surface;

d) positioning the tom-tom drum within the tom-tom drum holder assembly wherein the tom-tom drum is supported by the drum support member;

e) positioning the foot pedal assembly relative to the tom-tom drum holder assembly wherein the striker of the foot pedal assembly may impact the percussion contact surface of the tom-tom drum while the tom-tom drum is positioned within the tom-tom drum holder assembly;

whereby the tom-tom drum may replace the floor positioned bass drum.

15. A method of utilizing a tom-tom drum as a replacement for a floor positioned bass drum wherein the tom-tom drum is impacted by a striker following activation of the striker by a foot operated pedal assembly, the method comprising the steps of:

a) providing a tom-tom drum having:
   1) a body member having a percussion end, a distal end and a radially disposed wall member separating the percussion end and the distal end;
   2) a percussion contact surface positioned at the percussion end;

b) providing a tom-tom drum holder assembly comprising:
   1) a holder support member to provide for supporting the tom-tom drum holder assembly on a horizontally oriented surface;
   2) a tom-tom drum support member to provide for supporting the tom-tom drum, the tom-tom drum support member comprising:
      i) a first support member which supports the tom-tom drum in close proximity to the percussion end;
      ii) a second support member which supports the tom-tom drum in close proximity to the distal end;
   3) retention means to provide for a cooperation between the holder support member and the tom-tom drum support member to retain the tom-tom drum relative to the horizontally oriented surface wherein the percussion contact surface of the tom-tom drum is generally perpendicular to the horizontally oriented surface for impacting of the percussion contact surface by the striker following at least a partially horizontally oriented displacement of the striker;

c) providing a foot pedal assembly comprising:
   1) a housing member;
   2) a foot contact surface pivotally attached to the housing member;
   3) a striker member displaceably attached to the housing member, the striker member to provide for impact contact with the percussion contact surface of the tom-tom drum;
   4) linkage means to provide for displacement of the striker member in response to pressure applied to the foot contact surface;

d) positioning the tom-tom drum within the tom-tom drum holder assembly wherein the tom-tom drum is supported by the drum support member;

e) positioning the foot pedal assembly relative to the tom-tom drum holder assembly wherein the striker of the foot pedal assembly may impact the percussion contact surface of the tom-tom drum while the tom-tom drum is positioned within the tom-tom drum holder assembly;

whereby the tom-tom drum may replace the floor positioned bass drum.

16. A method of utilizing a tom-tom drum as a replacement for a floor positioned bass drum wherein the tom-tom drum is impacted by a striker following activation of the striker by a foot operated pedal assembly, the method comprising the steps of:

a) providing a tom-tom drum having:
   1) a body member having a percussion end, a distal end and a radially disposed wall member separating the percussion end and the distal end;
   2) a percussion contact surface positioned at the percussion end;

b) providing a tom-tom drum holder assembly comprising:
   1) a holder support member to provide for supporting the tom-tom drum holder assembly on a horizontally oriented surface;

2) a tom-tom drum support member to provide for supporting the tom-tom drum;

3) retention means to provide for a cooperation between the holder support member and the tom-tom drum support member to retain the tom-tom drum relative to the horizontally oriented surface wherein the percussion contact surface of the tom-tom drum is generally perpendicular to the horizontally oriented surface for impacting of the percussion contact surface by the striker following at least a partially horizontally oriented displacement of the striker;

4) a foot pedal attachment member connected to the holder support member, the foot pedal attachment member to provide for attachment of the foot pedal assembly to the tom-tom drum holder assembly, the foot pedal attachment member further comprising height adjustment means to provide for adjusting an elevational height of the foot pedal assembly relative to the holder support member;

c) providing a foot pedal assembly comprising:

1) a housing member;

2) a foot contact surface pivotally attached to the housing member;

3) a striker member displaceably attached to the housing member, the striker member to provide for impact contact with the percussion contact surface of the tom-tom drum;

4) linkage means to provide for displacement of the striker member in response to pressure applied to the foot contact surface;

d) positioning the tom-tom drum within the tom-tom drum holder assembly wherein the tom-tom drum is supported by the drum support member;

e) positioning the foot pedal assembly relative to the tom-tom drum holder assembly wherein the striker of the foot pedal assembly may impact the percussion contact surface of the tom-tom drum while the tom-tom drum is positioned within the tom-tom drum holder assembly;

whereby the tom-tom drum may replace the floor positioned bass drum.

* * * * *